US011416806B1

US 11,416,806 B1

(12) United States Patent
Aggarwal

(10) Patent No.: US 11,416,806 B1
(45) Date of Patent: Aug. 16, 2022

(54) DISTRIBUTED NUMERIC SEQUENCE GENERATION

(71) Applicant: Amazon Technologies, Inc., Seattle, WA (US)

(72) Inventor: Deepak Aggarwal, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 924 days.

(21) Appl. No.: 16/211,037

(22) Filed: Dec. 5, 2018

(51) Int. Cl.
| G06F 12/00 | (2006.01) |
| G06Q 10/08 | (2012.01) |
| G06F 12/0811 | (2016.01) |
| G06F 12/0871 | (2016.01) |
| G06F 12/0875 | (2016.01) |

(52) U.S. Cl.
CPC ..... *G06Q 10/0833* (2013.01); *G06F 12/0811* (2013.01); *G06F 12/0871* (2013.01); *G06F 12/0875* (2013.01)

(58) Field of Classification Search
CPC .................................................. G06Q 10/0833
USPC ......................................................... 711/118
See application file for complete search history.

(56) References Cited

U.S. PATENT DOCUMENTS

| 5,117,351 | A | 5/1992 | Miller |
| 5,327,365 | A | 7/1994 | Fujisaki et al. |
| 5,617,561 | A | 4/1997 | Blaauw et al. |
| 5,751,808 | A | 5/1998 | Anshel et al. |
| 6,212,638 | B1 | 4/2001 | Lee et al. |
| 6,324,558 | B1 | 11/2001 | Wilber |
| 6,539,410 | B1 | 3/2003 | Klass |
| 6,950,961 | B2 | 9/2005 | Krause et al. |
| 6,952,707 | B1 | 10/2005 | Josten |
| 7,503,068 | B2 | 3/2009 | Kaniyar et al. |
| 8,228,782 | B2 | 7/2012 | Han et al. |
| 8,792,510 | B2 * | 7/2014 | Yong ..................... H04L 1/1809 370/428 |
| 2007/0043580 | A1 | 2/2007 | Miller et al. |
| 2009/0287636 | A1 * | 11/2009 | Ren ........................ G06F 3/0661 |

* cited by examiner

*Primary Examiner* — Jae U Yu
(74) *Attorney, Agent, or Firm* — Robert C. Kowert; Kowert, Hood, Munyon, Rankin & Goetzel, P.C.

(57) ABSTRACT

Various embodiments of a distributed numeric sequence generation system and method are described. In particular, some embodiments provide high-scale, high-availability, low-cost and low-maintenance numeric sequence generation. The distributed numeric sequence generation system comprises one or more hosts, wherein individual hosts implement a cache for caching a plurality of numeric sequences. The hosts receive a maximum gap size limit for a numeric sequence, in some embodiments, and determine a total cache size of the cache associated with the one or more hosts to store the values of the numeric sequence, such that if the values in the cache were lost then the maximum gap size limit would not be exceeded. The hosts limit the number of values of the numeric sequence in the cache associated with the one or more hosts to the determined total cache size for the values of the numeric sequence, in some embodiments.

20 Claims, 11 Drawing Sheets

DISTRIBUTED NUMERIC SEQUENCE GENERATION

BACKGROUND

Businesses have been using unique numeric sequence identifications for many decades now. Use cases for unique numeric sequence identifications range from uniquely identifying data records, to generating human-readable business identifications, such as order identifications or product identifications. Usually these sequence identifications are positive, and go on from 1 to $2^{63}$ (2 to the power of 63, which is, in some use cases, practically infinity). Sometimes businesses use unique numeric sequence identifications in a more esoteric way where the sequences have a predefined maximum value and where the sequences expire when they reach that maximum value (aka bounded sequences), or where the sequences recycle back from the start when they reach that maximum value (aka recyclable sequences). Traditionally, businesses have used relational databases, such as Relational Database Management System ("RDMS") to generate these unique sequence identifications in a monotonic manner. Monotonic manner means that sequence numbers are given in a serially ascending or descending order. For example, 9 is vended after 8 has been vended when sequence numbers are provided in an ascending order. While this provides a unique sequence identification, it comes with many disadvantages. For example, the traditional methods may create a vendor lock-in, may be very expensive, may be low throughput, might not scale very well, may be low availability, and might have a high latency.

Conventional systems have used relational databases to provide numeric sequences because of the uniqueness requirement of the numeric sequences. Multiple different systems request the values of the various numeric sequences, and so conventional systems needed some kind of atomic or transactional mechanism to change the value provided for the numeric sequence in response to each request. In addition, there have been no other practical options available for providing unique numeric sequences. Therefore, each numeric sequence in a conventional system would have to be vended from a conventional database instance. However, running the numeric sequences consumes resources and is not cheap, and so the number of sequences that a single conventional database instance can create is also limited. A conventional database instance can only reliably provide on the order of a couple hundred distinct numeric sequences. Therefore, in order to vend on the order of 100,000 distinct unique numeric sequences, on the order of a couple hundred separate conventional database instances would need to be used. As mentioned previously, these couple hundred separate conventional database instances may create a vendor lock-in, may be very expensive, may provide only low throughput, might not scale very well, may be low availability, and might have a high latency.

Figure 1:
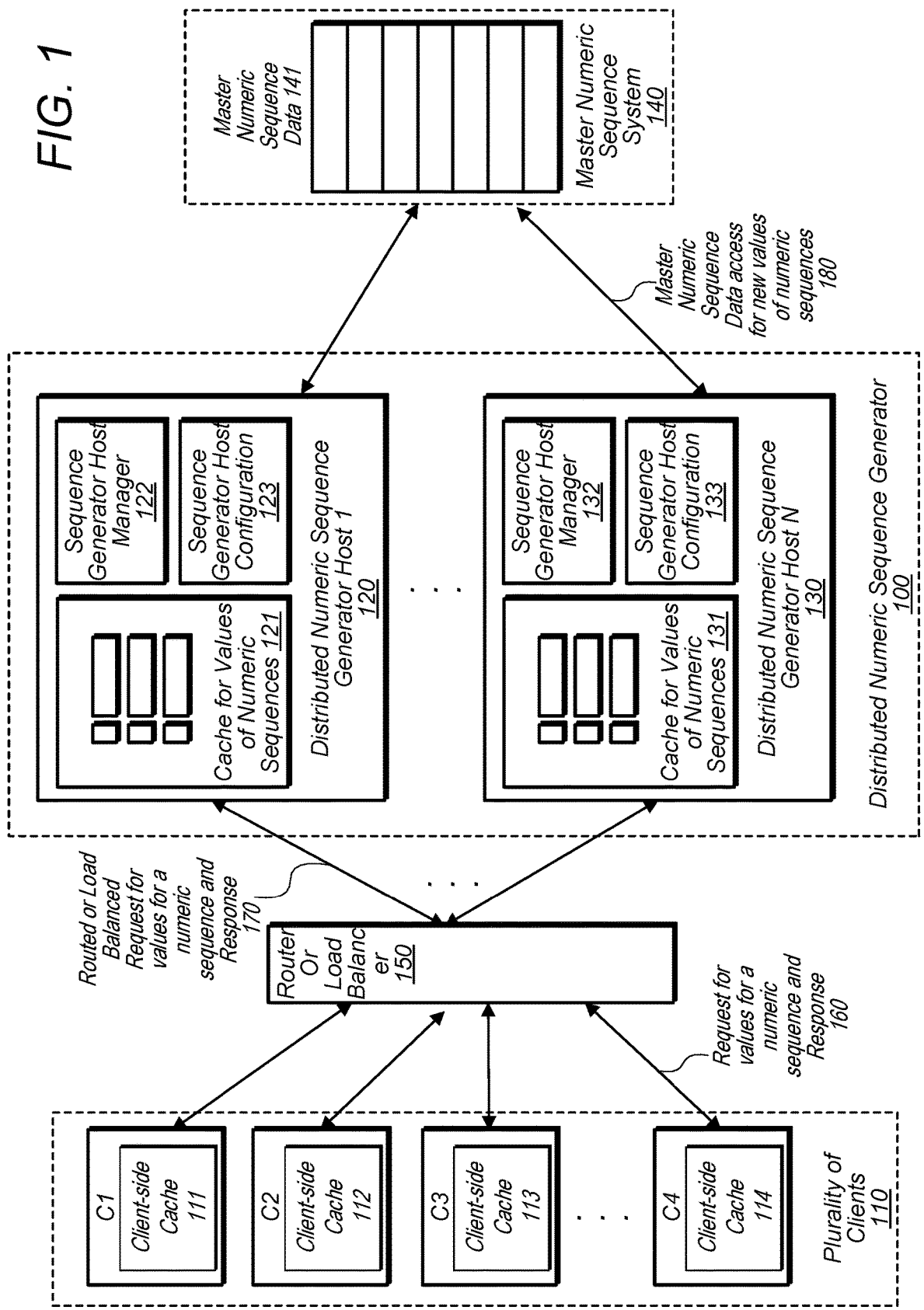
FIG. 1 illustrates a system that comprises a distributed numeric sequence generator comprising a plurality of hosts, a plurality of clients that are configured to request values from the distributed numeric sequence generator, and a master numeric sequence system comprising master numeric sequence data, according to some embodiments.

In the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/ circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of apparatuses and methods of a distributed numeric sequence generator are described. In particular, some embodiments provide a high scale, high availability, low cost and low maintenance recyclable and bounded numeric value generation in a non-Relational Database Management System ("non-RBMS") system by sacrificing monotonicity. These embodiments provide low-cost by allowing clients to stop using expensive conventional databases. Some of these embodiments provide high availability by providing multiple layers of caching, in which the caches can cache a day's worth of sequences, for example. These embodiments can provide protection from unavailability of downstream systems. In addition, some of these embodiments provide a smart background cache filler which refills the cache when it goes below particular threshold. In addition, these embodiments can provide an extremely high scale. For example, under 10 hosts can vend the same number of numeric sequences at the same rate as a conventional system that employs hundreds of conventional database instances.

Some embodiments of the distributed numeric sequence generator are able to provide these benefits by making certain trade-offs. For example, these embodiments do not provide strictly monotonic numeric sequences, but instead provide for a controlled monotonicity. For example, a non-monotonic sequence can be vended as 1, 2, 3, 4, 7, 5, and finally 6. In this example, 5 and 6 can be vended after 7. In addition, these embodiments may also not provide "high" density numeric sequences. A high-density numeric sequence is one in which there are no missing values or holes. Instead, many customers just need a unique value number and don't particularly need the numeric sequence to be high density, as opposed to expecting a "high" density sequence series where the numeric sequence is not resilient to any holes at all. For example, many clients can accept getting a sequence series 1, 2, 3, 7, 8, and 9, having a few "holes" in between wherein 4, 5, 6 is not vended at all. By not guaranteeing high density sequences, some embodiments of the distributed numeric sequence generator can instead provide high performance and scale in a distributed system at a significantly lower cost. In these embodiments, uniqueness for each numeric sequence is still guaranteed.

The distributed numeric sequence generator can have a number of use cases, depending on the embodiment. For example, the distributed numeric sequence generator can manage the generation of tracking IDs which are printed on the shipping label (as a bar code) during fulfillment of a customer package, in order to track orders in an e-commerce system. A tracking ID is a unique identifier for a carrier and is used by the customer to track the status of her package. The distributed numeric sequence generator in this embodiment can be responsible for generating the carrier specific tracking ID, using rules for the generation of a tracking ID that are provided by the carrier. Typically, the carrier would have a unique sequence range assigned to each fulfillment center, ship method, market place ID, etc. This means there are potentially a (Number of carriers*number of fulfillment centers*number of different shipping methods*a number of different marketplaces) combinations of different numeric sequences that would be needed in this example. A new numeric sequence would be created in this embodiment when a new carrier is onboarded, when an existing carrier launches a new shipping method, when a new node, such as a fulfillment center, or vendor flex site etc., is launched, when a new ship method is launched or enabled for a node, or when the existing sequence is about to expire. The distributed numeric sequence generator would be able to manage and generate values for each of these numeric sequences simultaneously, in these embodiments, where the values are then used by the e-commerce system to track orders and/or packages, where orders can be generated by customers for goods and/or services by interaction and use of a web-based e-commerce site. There are many other different kinds of use cases for a distributed numeric sequence generator, such as using the values of numeric sequences in the providing of network services or resources in a provider network.

Some embodiments of the distributed numeric sequence generator can provide a certain density in order to ensure that there will be no more than a certain number of missing values between vended values. This can be provided, in these embodiments, by configuring a total cache size of the distributed numeric sequence generator for the sequence. For example, these embodiments can ensure that the cumulative in-memory cache size is always below the configured total cache size of the sequence. Then if there is a system shutdown in these embodiments, for example, the distributed numeric sequence generator will not lose more than total cache size of values for the numeric sequence, thus limiting the size of holes on the sequence. In some embodiments, the total cache size can even be configured to zero such that there will not be any holes in a vended numeric sequence. In other embodiments, the certain density can also be provided by persisting the in-memory cache when the system is shutdown—for instance during a software deployment of the new version of software, or a bad host replacement. In these embodiments, persistence can be done in such a way that the uniqueness guarantee is maintained and a particular value is not vended more than once.

During the onboarding of a particular numeric sequence, in some embodiments, clients can configure the total cache size for the particular numeric sequence. Clients might also configure or adjust the total cache size at other points in time as well. In these embodiments, a customer can trade some of the density for better performance by adjusting the total cache size in order to find the balance that works for the customer, for example. Since the distributed numeric sequence generator has a distributed fleet, where each of the hosts of the fleet comprises a cache of numeric sequences, this total cache size must be divided across the entire fleet, in these embodiments. However, in some of these embodiments the size of the fleet size can be variable, such that the number of hosts is dynamic. In some of these embodiments, in order to ensure that number of values of a particular sequence never increases beyond the total cache size for that numeric sequence, the distributed numeric sequence generator can use a hypothetical "MAX HOST COUNT" which is a number larger than the fleet size could practically ever be. In some of these embodiments, the cache size per host would be calculated by: CacheSizePerHost=totalCacheSize/MAX HOST COUNT.

Some embodiments of the distributed numeric sequence generator provide support for bounded and/or recyclable sequences. A bounded sequence starts and/or ends at a particular value, for example. For example, a bounded series can start at the number 2 and end at the number 2000. Once the sequence reaches 2000 the sequence expires. A recyclable sequence, for example, is a sequence that starts and/or ends at a particular value, but instead of expiring when the sequence reaches the particular end value, the recyclable sequence instead restarts the numeric sequence at the starting value with a new cycle number. For example, a recyclable sequence can start at the number 2 and end at the number 2000, with a first cycle number of 1. Whenever the recyclable sequence reaches the particular end value of 2000, the recyclable sequence would restart at the beginning value of 2 again with a new cycle number, in this example. In some embodiments, the new cycle number can be 1 more than the previous cycle number. In these embodiments, the new cycle number would be 2 in the example given above. In some embodiments a given numeric sequence can have its sequence type changed at runtime. For example, a recyclable sequence can be changed to a non-recyclable and vice-versa in these embodiments.

In some embodiments each host of the distributed numeric sequence generator can employ two levels of caching. In some of these embodiments, an in-memory cache can be a first level of cache and a persistent cache can be a second level of cache. In some of these embodiments, these caches can be implemented as queues, such as a first-in first-out ("FIFO") queue. In addition, in some embodiments, each host can communicate to a master numeric sequence system comprising master numeric sequence data. This master numeric sequence system can be implemented a non-relational database in some embodiments. The master numeric sequence data can be implemented as a single table within the non-relational database, in some embodiments, where the single table contains information associated with a plurality of numeric sequences. The master numeric sequence data can also be implemented as multiple tables in the non-relational database, in some embodiments. In some of these embodiments each numeric sequence would be associated with a separate table in the master numeric sequence data. The master numeric sequence system has a global view of all the sequences that has been vended from all the hosts, in some embodiments.

Each of the distributed numeric sequence generator hosts caches the sequences obtained from the master numeric sequence data that is at the master numeric sequence system, in some embodiments. The hosts cache the sequences first into the persistent second level cache, and then caches them into the in-memory first level cache. In some embodiments, one or more of the hosts will attempt to store a day's worth of sequences in the persistent second level cache, and around 15 minutes worth of sequences in the in-memory first level cache. In some embodiments, the distributed numeric sequence generator might have a corresponding client application that is executed at a client. In some of these embodiments, this distributed numeric sequence generator client application might include its own cache for the values of the numeric sequences that it is requesting from the generator. In other embodiments a client might not have its own cache, or a client might have its own cache but the size of the cache might be set to 0. In some of the embodiments where a client contains its own cache of values, then there could potentially be a total of three layers of cache for any given value of a numeric sequence—two levels of cache on each host that has serviced a request for values of the numeric sequence, and one level of cache on the client itself.

In the embodiments described above where there are three levels of cache, when a client makes a request for values of a numeric sequence, it first checks the local client cache associated with the client application that is running on the client. If this cache does not have any additional values for the requested numeric sequence, then the client requests additional values from the distributed numeric sequence generator, in some embodiments. One of the hosts of the distributed numeric sequence generator will then respond to this request in these embodiments. The distributed numeric sequence generator first checks the in-memory first level cache for any values that pertain the requested numeric sequence, in some embodiments. If the in-memory first level cache does not have any values that pertain the requested numeric sequence, then at least two actions might be taken depending on the embodiment. First, the distributed numeric sequence generator might issue a retry response to the client indicating that the client should ask for the numeric value sometime later, in some embodiments. In other embodiments, the distributed numeric sequence generator might fallback to the persistent second level cache, and check the persistent second level cache for any values that pertain the requested numeric sequence. In some of these embodiments, when the persistent second level cache does not contain any values that pertain the requested numeric sequence, the distributed numeric sequence generator might issue a retry response to the client. In other embodiments, the distributed numeric sequence generator might fallback to the master numeric sequence system, and access the master numeric sequence data in the master numeric sequence system to obtain an additional value or values for the numeric sequence, which the distributed numeric sequence generator might return to the client, in some embodiments.

However, instead of only moving values of a numeric sequence between caches when a client makes a request for the values of that numeric sequence, some embodiments of the distributed numeric sequence generator include a background filler process in the hosts that can replenish the values for a numeric sequence in a particular cache if the quantity of values of the numeric sequence in that cache is below a particular threshold. For example, each host of the distributed numeric sequence generator might contain or execute a background in-memory filler process and a background persistent memory filler process, in some embodiments. These background filler processes can keep track of the number of values for a particular numeric sequence in the cache, and if the number of values falls below a certain threshold, the filler process can request the sequences from the next level of cache, in some embodiments. Therefore, in some of these embodiments, the background in-memory filler process will determine the number of values for a particular numeric sequence that are resident in the first level in-memory cache, and if the number of values falls below a certain threshold, then the background in-memory filler process will fetch additional values from the persistent second level cache to replenish the values in the in-memory first level cache. Likewise, in some of these embodiments, the background persistent memory filler process can determine the number of values for a particular numeric sequence that are resident in the second level persistent memory cache, and if the number of values falls below a certain threshold, then the background in-memory filler process can access the master numeric sequence data in the master numeric sequence system to obtain additional values for the numeric sequence to replenish the values in the persistent second level cache.

In addition to a background filler process, the hosts can also contain or execute a background exception processing process, in some embodiments. The background exception processing process might be used for numeric sequences that have somehow become delayed, in some embodiments. This can occur because the background filler processes in the hosts can operate on all the sequences that are present in the master numeric sequence data, which can be, in some embodiments, 100,000 or more different sequences. The background filler process in a host can be shared for all the different numeric sequences, in some of these embodiments. The background filler process can internally maintain a queue that stores the order in which the cache of the various numeric sequences need to be filled. When the background filler process attempts to fill the cache pertaining to a particular numeric sequence, the cache might not be able to be filled for some reason. For example, the client might be requesting values for a particular numeric sequence very rapidly which might cause a cache for that numeric sequence to become very low or empty.

In order to not delay the filling of the cache of other numeric sequences, the background filler process marks those numeric sequences as delayed and moves the processing of those numeric sequences to the background exception processing process, in some embodiments. The background filler process can keep track of a timeout, such that if the processing of numeric sequence exceeds the timeout, then the background filler process moves the processing of those numeric sequences to the background exception processing process. The background exception processing process can itself internally maintain a queue that stores the order in which the cache of the various delayed numeric sequences need to be filled, in some embodiments. The background exception processing process will process these delayed numeric sequences separate and apart from the background filler process, in these embodiments.

Instead of one background filler process and one background exception processing process handling the processing of all the numeric sequences of a host, a host can instead implement a shared bounded thread pool for all the sequences, in some embodiments. This shared bounded thread pool can keep the number of threads bounded no matter how many sequences are there in the host or the distributed numeric sequence generator as a whole. The distributed numeric sequence generator can operate to ensure that the threads rarely or never get starved, since if the threads did get starved all the sequences would be impacted. Therefore, the distributed numeric sequence generator can implement timeout on each background task, in some embodiments. The timed-out/exception tasks can be added to a separate queue and handled by a separate exception thread pool, in these embodiments. This will ensure that the tasks for the normal path are isolated from exception tasks and are not starved either due to noisy-neighbors or other unknowns. In addition, the background tasks can be "interruptible-friendly" such that any task checks for interruptible status and exit gracefully if interrupted, in some embodiments. Finally, the thread-pool can have bounded number of threads in the pool and a bounded task queue.

The master numeric sequence system can potentially have multiple hosts requesting values for one or more numeric sequences at the same time, in some embodiments. These multiple hosts might be requesting values for the exact same numeric sequence in these embodiments. Therefore, in some embodiments the master numeric sequence system has a mechanism that guarantees that it doesn't return the same values for the same numeric sequence to two different hosts. For example, a host can perform a conditional update or an atomic update to the information associated with the numeric sequence in the master numeric sequence data in some embodiments. This conditional update can ensure that no other host modifies the data in the master numeric sequence data before the host is able to itself update the data. In some embodiments, the master numeric sequence data is a database table that simply stores the first value that has not yet been vended to the distributed numeric sequence generator for each numeric sequence. When a host accesses the master numeric sequence data in the master numeric sequence system to obtain additional values for the numeric sequence, in these embodiments, the host updates the stored first value that has not yet been vended, so that it is increased by the amount of values that it wishes to vend for that particular numeric sequence. For example, if the master numeric sequence data shows that the first value that has not yet been vended for numeric sequence #4 is value 57, and a host wishes to vend 8 values for numeric sequence #4, then the host will update the 57 in the master numeric sequence data to a 65.

In some embodiments, one or more of the hosts will attempt to store a day's worth of sequences in the persistent second level cache, and around 15 minutes worth of sequences in the in-memory first level cache. In these embodiments, the distributed numeric sequence generator can measure the consumption rate of values of a numeric sequence by the clients. Based on the measured consumption rate, the distributed numeric sequence generator can evaluate how much cache is utilized for one day's worth of values, and how much cache is utilized for 15 minutes worth of values. The distributed numeric sequence generator can fill the appropriate cache accordingly to the amount of cache that is consumed in the appropriate amount of time whenever the amount of values for the numeric sequence in the cache drops below the appropriate threshold, in these embodiments. In other embodiments, there might be a ratio of values that are to be stored in the various levels of cache. For example, the ratio might be 1 to 4 meaning that 1 value is stored in the in-memory first level cache for every 4 values that are stored in the persistent second level cache. This ratio might be able to be set and adjusted by the client, in some embodiments.

However, in the embodiments in which the customer configures a total cache size for a particular numeric sequence, the amount of values that is stored in a cache can also be dependent on the configured total cache size. Based on at least the total cache size, that can potentially by configured by a client, and a number of hosts in the distributed numeric sequence generator (which may be the current number of hosts, a future number of hosts, or a maximum limit on the number of hosts, depending on the embodiment) the distributed numeric sequence generator can determine the cache size to be utilized per host ("CacheSizeperHost") for any given numeric sequence. This CacheSizeperHost limit can apply to the entire cache or only a portion of the cache, depending on the embodiment. The CacheSizeperHost limit might apply to the sum of the values for a numeric sequence in all levels of the cache. In other embodiments, the CacheSizeperHost limit might only apply to the in-memory cache and not apply to the persistent cache, since a host failure will only result in the loss of the in-memory cache, and not the persistent cache, meaning that any potential holes in a numeric sequence will only result from the loss of the in-memory cache. In still other embodiments, the CacheSizeperHost limit might apply to the sum of the values of a numeric sequence present in the in-memory cache and the client cache. For other caching structures, the CacheSizeperHost limit might apply to other portions of sub-portions of the total cache, or to the total cache itself.

In some embodiments, the amount of cache that is utilized to store the values of a given numeric sequence at any given cache level is the lesser of the number of values that is consumed in the appropriate amount of time, or the CacheSizeperHost limit as it applies to the given cache level. For example, if we are computing the amount of values to store in an in-memory cache, we would take into account the number of values that are consumed by the clients from the particular host over the course of a predetermined amount of time. For example, the predetermined amount of time might be 15 minutes, and all clients might consume 100 values from this one host over this 15-minute span. In this example, to compute the amount of values to store in the in-memory cache, we would also need to compute the CacheSizeper-Host limit from the total cache size set by the client, and we would need to know what levels of cache this CacheSizeper-Host limit pertains to. For example, the total cache size might be 200 values, and the maximum number of hosts in the system might be 10, resulting in a CacheSizeperHost limit of 20. In this example, the CacheSizeperHost might apply to only the in-memory first level cache. Therefore, the number of values that can be stored in the in-memory cache at this particular host for this numeric sequence is the lesser of the number of values consumed from this one host over a 15-minute span, or 100, and the CacheSizeperHost limit of 20. The number of values that can be stored in the in-memory cache at this particular host for this numeric sequence would therefore be set at 20 in this example.

When a client requests additional values for a numeric sequence from the distributed numeric sequence generator, the request can be sent to any of the hosts of the distributed numeric sequence generator, in some embodiments. In these embodiments, any host of the distributed numeric sequence generator is capable of responding to requests for values of any numeric sequence from any client. All the hosts can vend values for all the numeric sequences, in these embodiments. However, particular values for a numeric sequence will only be resident on one particular host, in these embodiments. For example, values 1, 2, and 3 for a given numeric sequence might be resident on host 1, and values 4, 5, and 6 might be resident on host 3. If host 3 responds to the request from the client for additional values of the numeric sequence, then it will vend values 4, 5, and 6 before values 1, 2, or 3 have been vended, for example. This is one reason why the values for any given numeric sequence might be vended non-monotonically.

A router or load balancer or other forwarding device might be present in front of the distributed numeric sequence generator or as part of the distributed numeric sequence generator, depending on the embodiment. When a client requests the distributed numeric sequence generator for additional values of a given numeric sequence, the router or load balancer or other forwarding device might first receive the request, and then might forward the request to one of the hosts of the distributed numeric sequence generator, in these embodiments. The router or load balancer or other forwarding device might use a load balancing scheme to determine a host to forward the request to, in some embodiments. The router or load balancer or other forwarding device might use performance statistics from the hosts to inform its determination of which host to forward the request to, in some embodiments. In other embodiments, the router or load balancer or other forwarding device might forward requests for specific numeric sequences only to specific hosts, such that less than all the hosts respond to requests for a specific numeric sequence.

A numeric sequence can expire for a number of reasons. A bounded numeric sequence might reach its maximum value and therefore expire. A client or a set of clients might determine that a particular numeric sequence is no longer needed, and might inform a host that the sequence should be expired. A numeric sequence might be unused for a period of time, where there exists a time period such that a numeric sequence expires if it is unused for this time period, for example. There are many other reasons why a numeric sequence might expire. One host of the distributed numeric sequence generator will first learn or determine that a numeric sequence is expired, in some embodiments. For example, when a host accesses the master numeric sequence data in the master numeric sequence system to obtain additional values for the numeric sequence, it might determine that the additional values would push the bounded numeric sequence over the maximum value, and therefore become expired. A host might periodically check some or all numeric sequences in in the master numeric sequence data and determine, based on this check, that a numeric sequence has been unused for a certain amount of time. The host might receive an indication from a client that a numeric sequence should be expired.

When a host of the distributed numeric sequence generator determines or learns that a numeric sequence is designated as expired in master numeric sequence data, then the host can perform a number of actions, in some embodiments. The host can designate the numeric sequence as expired in the master numeric sequence data. The host can remove the values for the numeric sequence from the host's cache. Furthermore, the host can designate the numeric sequence as expired at the host. The host might also inform a requesting client that the numeric sequence is expired. When other hosts of the distributed numeric sequence generator access the master numeric sequence data in the master numeric sequence system to obtain additional values for the numeric sequence, they will learn that the numeric sequence is expired, in some embodiments. In addition, in some embodiments, the other hosts might periodically poll the master numeric sequence data to receive configuration updates about the numeric sequence, and during these polls the other hosts might learn that the numeric sequence has expired. When the other hosts determine or learn that a numeric sequence is designated as expired in master numeric sequence data, then the other hosts remove the values for the numeric sequence from their respective caches, in some embodiments.

Some or all of the hosts of the distributed numeric sequence generator have a numeric sequence configuration cache, in some embodiments. The caches store the numeric sequence configuration of some or all of the plurality of numeric sequences, in these embodiments. The sequence configuration cache might store only the configurations of the numeric sequences that the host has been servicing, in some embodiments. In other embodiments, the sequence configuration cache might store configurations for all the numeric sequences existing in the master numeric sequence data. There are many other types of storage for a host's sequence configuration cache. The hosts can periodically poll the master numeric sequence system for configuration updates to the master numeric sequence data, in some embodiments. This polling can happen every minute for every host of the distributed numeric sequence generator, in some embodiments. When polling the master numeric sequence system for configuration updates to the master numeric sequence data, the hosts can then update their own numeric sequence configuration cache with the updated information from the master numeric sequence data, in some embodiments. When a host learns that a numeric sequence has expired from this polling, the host can perform some or all of the actions described previously for expired numeric sequences, in these embodiments.

In some embodiments, there is a user interface-based administration tool for managing some or all of the numeric sequences handled by the distributed numeric sequence generator. The tool can be used for managing the sequences, for example to fix incorrect configuration values of numeric sequences, or for having visibility into existing sequences, in some embodiments. Depending on the embodiment, the tool can potentially list all the onboarded sequences, view a particular sequence and its on-boarding details such as its onboarding date, its last value, its projected expiry, and/or its utilization, and/or update the expiry of a sequence.

As one skilled in the art will appreciate in light of this disclosure, certain embodiments may be capable of achieving certain advantages, including some or all of the following: (1) providing a high scale, high availability, low cost and low maintenance distributed numeric value generation; (2) providing a lower-cost numeric value generation by allowing clients to stop using expensive conventional databases; (3) providing high scale by, for example, allowing a vastly fewer number of hosts vend the same number of numeric sequences than the quantity of conventional database instances that a conventional system would use; (4) providing the ability to seamlessly operate with bounded and recyclable numeric sequences; (5) providing high availability by, for example, providing multiple layers of caching; (6) providing protection from the potential unavailability of downstream systems; and (7) being able to manage and generate values for a large quantity of numeric sequences simultaneously; and/or (8) providing a distributed system that guarantees a certain density to numeric sequences in order to ensure that there will be no more than a certain number of missing values between vended values.

Design for Supporting Different Types of Sequences

The distributed numeric sequence generator can support many different types of sequences. For example, unbounded sequences are sequences that are incremented without bound. These sequences have a start value but no specified ending value or MaxValue. As another example, bounded sequences with no cycle are bounded sequences that expire at a predefined upper limit, but do not recycle. Once a sequence reaches its upper bound, then the sequence expires. As another example, bounded recyclable sequences are bounded sequences that start vending from their start value again once the upper bound (maxValue) has been reached.

For bounded sequences with no cycle, the implementation details of the distributed numeric sequence generator can vary depending on the embodiment. When onboarding a bounded sequence with no cycle, certain embodiments of the distributed numeric sequence generator will receive these inputs: sequence type, first value, increment, offset, owner, alert percentage, region, maxValue, cache size. In addition, an isRecyclable attribute will be set to false.

In addition, certain embodiments of the distributed numeric sequence generator can maintain certain runtime values for bounded sequences with no cycle. Some runtime values might be isExpired, configUpdatedTimestamp, and isDeleted. The isExpired value can be initialized to false. The distributed numeric sequence generator can update this isExpired value to true when currentValue=maxValue. The configUpdatedTimestamp can be added so that the distributed numeric sequence generator knows when an expiry/delete/recycle has happened. It is also helpful for the distributed numeric sequence generator to know which sequences have been updated since it last polled for configuration updates from the master numeric sequence system. The configUpdatedTimestamp might be updated only for configuration updates (including isExpired, isDeleted, cycleNumber) and not for current value updates, for example. In certain embodiments, the configUpdatedTimestamp attribute can be updated when the currentValue=maxValue in the master numeric sequence data, a sequence is deleted, or when a recyclable sequence moves to a new cycle. The isDeleted value can be used for any type of sequence (unbounded, bounded with no cycle, or bounded recyclable, etc.) to indicate if a sequence is deleted or not, where deletion indicates that a sequence has been terminated by the customer since the customer no longer wanted it for whatever reason. In certain embodiments the maxValue can be nullable, where a null value indicates that the numeric sequence has no maxValue, and keeps incrementing without any upper bound, effectively making the numeric sequence not bounded. An active sequence can be one which has both isExpired=null and isDeleted=null. These values will be initialized to false.

In certain embodiments of bounded sequences with no cycle, the minimum number of sequences vended should be 1000. For example, the (endValue−startValue)/increment should be greater than or equal to 1000. In these embodiments, since the range of sequences can be as low as 1000, it makes more sense to have a Fixed size caching strategy in the distributed numeric sequence generator, instead of a consumption rate-based strategy. This can give better control on the holes that can be created in the sequence series due to in memory cache loss, in these embodiments. The cache size configured can control the monotonicity of the sequence as well.

The design for bounded sequences with a cycle can be similar, in certain embodiments. Since the distributed numeric sequence generator is a multi-host service that caches sequences, when numeric sequences move to the next cycle by the actions of one host, there may be other hosts that have sequences cached from previous cycles. Therefore, there will be a brief period of time during cycle transitioning that sequences vended to customers will be interleaved from different cycles. In some of these embodiments, this would mean that sequences from the in-memory cache and the persistent cache will need to have a primary key to be set as the value+the cycle number. In addition, in certain embodiments, the sequence batch sent to the customer for recyclable sequences can include current cycle number. Also, each recyclable sequence pool, in some or all levels of the cache, will know the current cycle number of the values in the numeric sequence.

When onboarding a recyclable sequence, certain embodiments of the distributed numeric sequence generator will receive these additional inputs: MaxValue, and isRecyclable. The isRecyclable parameter should be set to true for recyclable sequences. In addition, certain embodiments of the distributed numeric sequence generator can maintain certain runtime values for recyclable sequences. Some runtime values might be configUpdatedTime Stamp, cycleNumber, lastRecycleTimeStamp. The configUpdatedTimeStamp parameter can be used to determine when a recycle event happened. The configUpdatedTimeStamp attribute will be updated by the distributed numeric sequence generator when it records that currentValue=maxValue. An active recyclable sequence is one where isDeleted=null, in some embodiments.

The distributed numeric sequence generator will detect that a numeric sequence is to be recycled when fetching a batch of values from the master numeric sequence data with cycleNumber>cycleNumber-in-memory. Since the master numeric sequence data will be the authoritative source for the maxValue and cycleNumber of a numeric sequence, a host will always fetch maxValue and cycleNumber parameters along with the sequence batch. This ensures that a host of the distributed numeric sequence generator will always get up to date values of maxValue and cycleNumber. This will give applications the flexibility to change maxValue if so desired by the customer without ever worrying about the distributed numeric sequence generator having a stale value of the same. The sequence of steps that the distributed numeric sequence generator hosts can take when a recycle event is detected, in certain embodiments are: 1. Record in the master numeric sequence data and the host's sequence state store the lastRecycleTimestamp and the new cycle number; 2. Record the new cycle number in the in-memory and persistent caches.

Whatever the current cycleNumber, a configuration change from a recyclable to a non-recyclable sequence type can be allowed, in certain embodiments, as long as curValue<maxValue for the numeric sequence. This configuration change would mark isRecyclable=false in the master numeric sequence data. Behavior for this change would be that the sequence would expire when it reaches max value, and the sequence batch vended would have current cycleNumber (which could be greater than zero).

Whatever the current cycle Number, a configuration change from a non-recyclable to a recyclable sequence type can be allowed, in certain embodiments, as long as curValue<maxValue. This config change would mark isRecyclable=true in the master numeric sequence data, and keep the cycle number to whatever it was previously. This would help retain history in case of multiple updates back and forth. Behavior for this change would be that the sequence would begin to demonstrate normal recyclable sequence behavior, and the sequence batch vended would have current cycleNumber.

The distributed numeric sequence generator can also provide numeric sequences with limited density and limited monotonicity, in some embodiments. This can be done by using a fixed cache size for sequences on both the hosts of the distributed numeric sequence generator and at the client. In the case of a host failure, the holes created can be controlled and limited to the configured cache size, unlike in the case of consumption rate-based caching strategy. During onboarding of a numeric sequence, the client will provide the client cache size per host and/or the total cache size. The client cache size per host is the cache size per host on the client. The client is expected to provide a reasonable cache size so that the performance of the system does not degrade. The total cache size ("Total_Cache_Size") is the cumulative/total cache size on the distributed numeric sequence generator. The client is expected to provide a reasonable cache size so that the performance of the system does not degrade.

The cache size per distributed numeric sequence generator host can be calculated, in certain embodiments. The cache size of the first level cache, which can be the in-memory cache in certain embodiments, can be designated as L1CacheSizePerHost. The cache size of the second level cache, which can be the persistent cache in certain embodiments, can be designated as L2CacheSizePerHost. These parameters can be calculated by using the following input parameters:

SERVER_DESIRED_L1_TO_L2_RATIO: This the ratio of desired L1 (which in some embodiments is the in-memory cache) to L2 (which in some embodiments is the persistent cache) cache size for sequences with a Fixed Cache Size strategy (e.g. Bounded Sequences). It can be set at 0.25 as a default in some embodiments. It should be less than one in most embodiments.

MAX_HOST_COUNT: This is the maximum number of hosts in the distributed numeric sequence generator fleet. This will be used to divide the Total_Cache_Size among the L1 and L2 caches for a single host. It can be set at 15 as a default in some embodiments.

MIN_SERVER_CACHE_SIZE_PER_POOL: This is the minimum allowed value for any server side L1 or L2 cache pool on a host. It can be set at 4 as a default in some embodiments.

The host cache sizes can be computed as follows, in some embodiments:

$L1CacheSizePerHost=\max\{MIN\_SERVER\_CACHE\_SIZE\_PER\_POOL,$
$((Total\_Cache\_Size*SERVER\_DESIRED\_L1\_TO\_L2\_RATIO)/$
$(MAX\_HOST\_COUNT*(1+SERVER\_DESIRED\_L1\_TO\_L2\_RATIO)))\}$ $L2CacheSizePerHost=\max\{MIN\_SERVER\_CACHE\_SIZE\_PER\_POOL, ((Total\_Cache\_Size)/(MAX\_HOST\_COUNT*$
$(1+SERVER\_DESIRED\_L1\_TO\_L2\_RATIO)))\}$ Embodiments of a Distributed Numeric Sequence Generator FIG. 1 illustrates a system that comprises a distributed numeric sequence generator 100 comprising a plurality of hosts 120 . . . 130, a plurality of clients 110 that are configured to request values 160 from the distributed numeric sequence generator 100, and a master numeric sequence system 140 comprising master numeric sequence data 141, according to some embodiments. Embodiments of a distributed numeric sequence generator 100 are described that may be implemented on or by a provider network, in some embodiments, that communicates with the plurality of clients 110. In other embodiments a distributed numeric sequence generator 100 may be implemented in enterprise networks or simple client-server networks, or any kind of network where a computer accesses a resource through a network.

The distributed numeric sequence generator 100 may be operated by an entity to provide one or more services, such as various types of cloud-based computing or storage services, accessible via the Internet and/or other networks to client(s) 110. The distributed numeric sequence generator 100 may include numerous data centers hosting various resource pools, such as collections of physical and/or virtualized computer servers, storage devices, networking equipment and the like, needed to implement and distribute the infrastructure and services offered by the distributed numeric sequence generator 100. In some embodiments the distributed numeric sequence generator 100 may employ computing resources for its provided services.

The client(s) 110 may encompass any type of client configurable to submit requests to the distributed numeric sequence generator 100. For example, a given client 110 may include a suitable version of a web browser or may include a plug-in module or other type of code module configured to execute as an extension to or within an execution environment provided by a web browser. Alternatively, a client 110 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 110 may be configured to generate network-based services requests according to a Representational State Transfer (REST)-style network-based services architecture, a document- or message-based network-based services architecture, or another suitable network-based services architecture. In some embodiments, the distributed numeric sequence generator 100 may offer its services as web services, and the client(s) 110 may invoke the web services via published interfaces for the web services. In some embodiments, a client 111, 112, 113, or 114 (e.g., a computational client) may be configured to provide access to the distributed numeric sequence generator 100 in a manner that is transparent to applications implemented on the client(s) 110 utilizing computational resources provided by the distributed numeric sequence generator 100.

The client(s) 110 may convey network-based services requests to the distributed numeric sequence generator 100 via network connections. In various embodiments, network connections may encompass any suitable combination of networking hardware and protocols necessary to establish network-based communications between clients 110 and the distributed numeric sequence generator 100. For example, a network connection may generally encompass the various telecommunications networks and service providers that collectively implement the Internet. A network connection may also include private networks such as local area networks (LANs) or wide area networks (WANs) as well as public or private wireless networks. For example, both a client 110 and the distributed numeric sequence generator 100 may be respectively provisioned within enterprises having their own internal networks. In such embodiments, the network connection may include the hardware (e.g., modems, routers, switches, load balancers, proxy servers, etc.) and software (e.g., protocol stacks, accounting software, firewall/security software, etc.) necessary to establish a networking link between the client 110 and the Internet as well as between the Internet and the distributed numeric sequence generator 100. In some embodiments, client(s) 110 may communicate with the distributed numeric sequence generator 100 using a private network rather than the public Internet.

The system in FIG. 1 includes a router or load balancer 150 and a master numeric sequence system 140 that comprises master numeric sequence data 141. The router or load balancer 150 can be network appliance which performs a network connection termination function in order to provide an endpoint for the network connection from the clients, in some embodiments. In FIG. 1, there are network connections shown from each of the clients to the router or load balancer 150. The router or load balancer 150 can route packets to and from the plurality of hosts 120, 130 of the distributed numeric sequence generator 100.

The system can also include network interfaces, tunnel network interfaces, and stream sockets. A network interface can be a device which sends packets to the network and receive packets from the network, in some embodiments. Network interfaces can be attached to either the router or load balancer 150 or the distributed network sequence generator 100. If a network interface is attached to the router or load balancer 150 or the distributed network sequence generator 100, then the router or load balancer 150 or the distributed network sequence generator 100 will be receiving and processing all network packets which are sent to the network interface. Network interface can have IP addresses associated with it. A tunnel network interface ("TNI") can be a type of network interface which is attached to the distributed network sequence generator 100 and used to establish tunnel between the master numeric sequence system 140 and the distributed network sequence generator 100, in some embodiments. A stream socket can be a representation of the network connection with the clients 110, in some embodiments. It can have associated information about the remote endpoint on a particular client 111, 112, 113, or 114, as well as the corresponding network connection state.

The router or load balancer 150 might be present in front of the distributed numeric sequence generator 100 or as part of the distributed numeric sequence generator 100, depending on the embodiment. When a client, for example 114, requests the distributed numeric sequence generator 100 for additional values of a given numeric sequence, the router or load balancer 150 might first receive the request, and then might forward the request to one of the hosts 120 . . . 130 of the distributed numeric sequence generator 100, in these embodiments. The router or load balancer 150 might use a load balancing scheme to determine a host 120 . . . 130 of the plurality of hosts to forward the request to, in some embodiments. The router or load balancer 150 might use performance statistics from the hosts 120 . . . 130 to inform its determination of which host 120 . . . 130 to forward the request to, in some embodiments. In other embodiments, the router or load balancer 150 might forward requests for specific numeric sequences only to specific hosts, such that less than all the hosts respond to requests for a specific numeric sequence.

The distributed numeric sequence generator 100 comprises a plurality of hosts 1 through N, shown as host 1 (120) through host N (130). Each of the distributed numeric sequence generator hosts (120 . . . 130) caches values obtained from the master numeric sequence data 141 in the master numeric sequence system 140 at the cache for values of numeric sequences (121, 131).

Each host (120 . . . 130) also comprises a sequence generator host manager (122, 132) and a sequence generator host configuration (123, 133). The sequence generator host manager (122, 132) can, in some embodiments, comprise a smart background cache filler(s) which refills the cache 121 or a portion of the cache when it goes below particular threshold. The background filler process in the sequence generator host manager (122, 132) can replenish the values for a numeric sequence in a particular cache if the quantity of values of the numeric sequence in that cache is below a particular threshold. The background filler process can keep track of the number of values for a particular numeric sequence in the cache, and if the number of values falls below a certain threshold, the filler process can request the sequences from the next level of cache, in these embodiments. When the cache 121 comprises multiple layers, the sequence generator host manager (122, 132) can comprise a background cache filler for every layer of the cache. For example, in embodiments with two layers of cache, the sequence generator host manager (122, 132) can comprise a background in-memory cache filler for the first level cache, and a background persistent cache filler for the second level cache. In addition, the sequence generator host manager (122, 132) can comprise logic for responding to sequence requests from clients. In addition, the sequence generator host manager (122, 132) can comprise exception processing logic for those processing numeric sequences whose values cannot be retrieved quickly enough to replenish the cache, in some embodiments.

The sequence generator host configuration unit (123, 133) can periodically poll the master numeric sequence system 140 for configuration updates to the master numeric sequence data 141, in some embodiments. This polling can happen every minute for every host of the distributed numeric sequence generator, in some embodiments. The sequence generator host configuration unit (123, 133) can also include a numeric sequence configuration cache, in some embodiments. The cache can store the numeric sequence configuration of some or all of the plurality of numeric sequences, in these embodiments. The sequence configuration cache might store only the configurations of the numeric sequences that the host has been servicing, in some embodiments. In other embodiments, the sequence configuration cache might store configurations for all the numeric sequences existing in the master numeric sequence data. There are many other types of storage for a host's sequence configuration cache. When polling the master numeric sequence system 140 for configuration updates to the master numeric sequence data 141, the sequence generator host configuration unit (123, 133) can then update their own numeric sequence configuration cache with the updated information from the master numeric sequence data 141, in some embodiments. When a sequence generator host configuration unit (123, 133) learns that a numeric sequence has expired from this polling, the sequence generator host configuration unit (123, 133) can perform some or all of the actions described previously for expired numeric sequences, in these embodiments.

In some embodiments, each host (120 . . . 130) can communicate to a master numeric sequence system 140 comprising master numeric sequence data 141. This master numeric sequence system 140 can be implemented a non-relational database in some embodiments. The master numeric sequence data 141 can be implemented as a single table within the non-relational database, in some embodiments, where the single table contains information associated with a plurality of numeric sequences. The master numeric sequence data 141 can also be implemented as multiple tables in the non-relational database, in some embodiments. In some of these embodiments each numeric sequence would be associated with a separate table in the master numeric sequence data. The master numeric sequence system has a global view of all the sequences that has been vended from all the hosts, in some embodiments.

The master numeric sequence system 140 can potentially have multiple hosts (120, 130) requesting values for one or more numeric sequences at the same time, in some embodiments. These multiple hosts (120, 130) might be requesting values for the exact same numeric sequence in these embodiments. Therefore, in some embodiments the master numeric sequence system 140 has a mechanism that guarantees that it doesn't return the same values for the same numeric sequence to two different hosts. For example, a host (120, 130) can perform a conditional update or an atomic update to the information associated with the numeric sequence in the master numeric sequence data 141 in some embodiments. This conditional update can ensure that no other host modifies the data in the master numeric sequence data 141 before the host is able to itself update the data, in some embodiments. In some embodiments, the master numeric sequence data 141 is a database table that simply stores the first value that has not yet been vended to the distributed numeric sequence generator 100 for each numeric sequence. When a host (120, 130) accesses the master numeric sequence data 141 in the master numeric sequence system 140 to obtain additional values for the numeric sequence, in these embodiments, the host (120, 130) updates the stored first value that has not yet been vended, so that it is increased by the amount of values that it wishes to vend for that particular numeric sequence. For example, if the master numeric sequence data 141 shows that the first value that has not yet been vended for numeric sequence #4 is value 57, and a host (120 or 130) wishes to vend 8 values for numeric sequence #4, then the host will update the 57 in the master numeric sequence data (141) to a 65.

Figure 2:
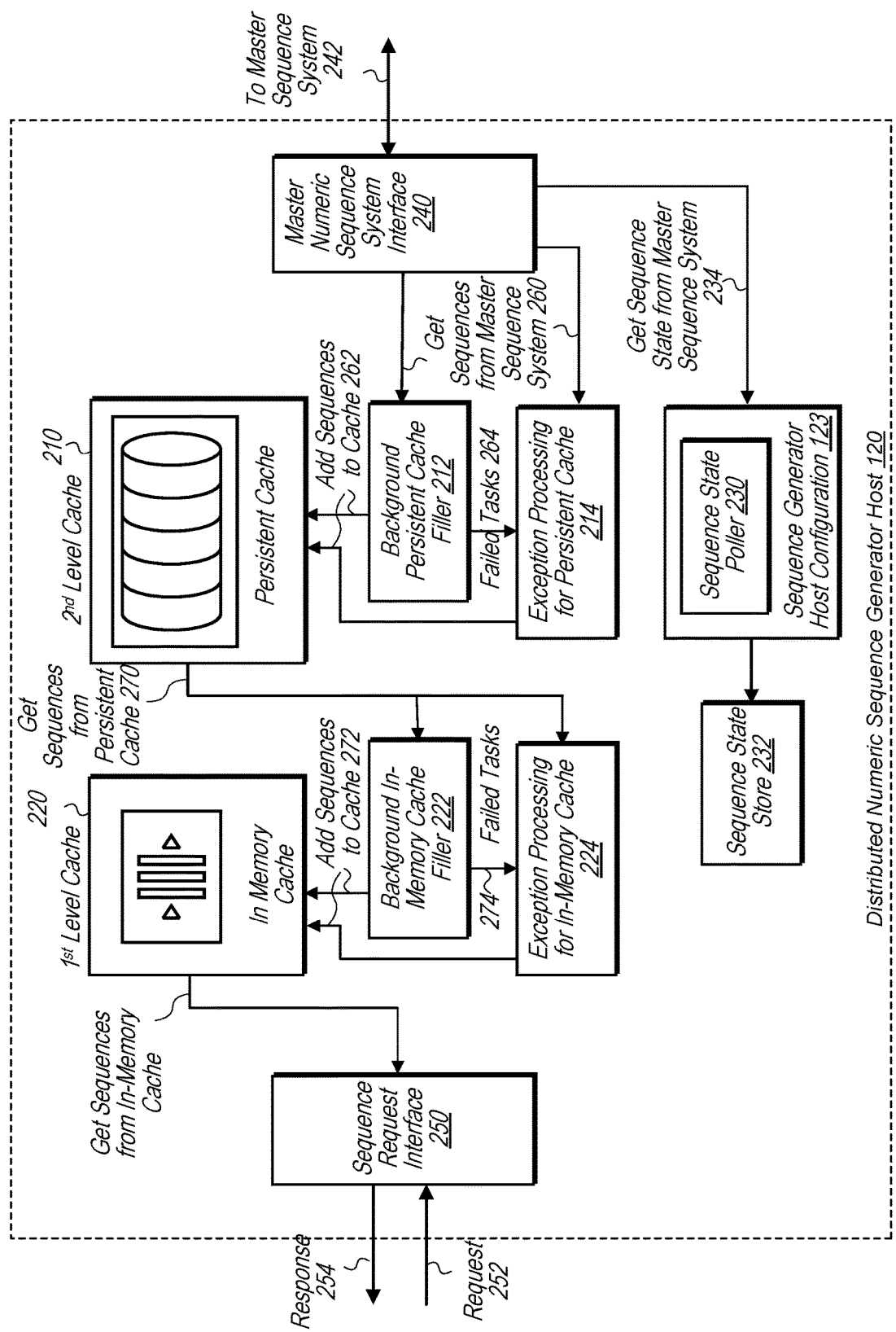
FIG. 2 illustrates an embodiment of distributed numeric sequence generator host comprising two levels of cache.

FIG. 2 illustrates an embodiment of distributed numeric sequence generator host 120 (but could also be representative of 130 also) comprising two levels of cache. The distributed numeric sequence generator host 120 has a first-level cache 220 that is an in-memory cache, and a second level cache 210 that is a persistent cache. The distributed numeric sequence generator host 120 also has two interfaces. A sequence request interface 250 that communicates with clients and receives requests 252 for values of numeric sequences and provides responses 254 to those requests. When the sequence request interface 250 receives a request from a client, it attempts to retrieve values for the requested numeric sequence from the first-level in-memory cache. A master numeric sequence system interface 240 interfaces to the master numeric sequence system to, for example, allow access the master numeric sequence data in the master numeric sequence system to obtain additional values for a numeric sequence.

The distributed numeric sequence generator host 120 also comprises two filler tasks, threads, or processes (depending on the embodiment)—a background in-memory cache filler 222 and a background persistent cache filler 212. These background filler processes, tasks, or threads (212, 222) can keep track of the number of values for a particular numeric sequence in the cache, and if the number of values falls below a certain threshold, the filler process can request the sequences from the next level of cache, in these embodiments. Therefore, in these embodiments, the background in-memory filler process, task, or thread 222 will determine the number of values for a particular numeric sequence that are resident in the first level in-memory cache 220, and if the number of values falls below a certain threshold, then the background in-memory filler process, task, or thread 222 will fetch additional values from the persistent second level cache 210 to replenish the values in the in-memory first level cache 220. Likewise, in these embodiments, the background persistent memory filler process, task, or thread 212 can determine the number of values for a particular numeric sequence that are resident in the second level persistent memory cache 210, and if the number of values falls below a certain threshold, then the background in-memory filler process, task, or thread 212 can access the master numeric sequence data in the master numeric sequence system 242 through the master numeric sequence system interface 240 to obtain additional values for the numeric sequence to replenish the values in the persistent second level cache 210.

The distributed numeric sequence generator host 120 also comprises two exception processing tasks, threads, or processes—an exception processing for the in-memory cache 224, and an exception processing for the persistent cache 214. The background exception processing (214 and 224) can be used for numeric sequences, or tasks processing the numeric sequences (264 and 274), that have somehow become delayed, in some embodiments. This can occur because the background filler processes (212 and 222) in the hosts can operate on all the sequences that are present in the master numeric sequence data, which can be, in some embodiments, 100,000 or more different sequences. The background filler process (212 and 222) in a host can be shared for all the different numeric sequences, in some of these embodiments. The background filler process (212 and 222) can internally maintain a queue that stores the order in which the cache of the various numeric sequences need to be filled. When the background filler process (212 and 222) attempts to fill the cache pertaining to a particular numeric sequence, the cache might not be able to be filled for some reason. For example, the client might be requesting values for a particular numeric sequence very rapidly which might cause a cache for that numeric sequence to become very low or empty.

In order to not delay the filling of the cache of other numeric sequences, the background filler process (212 and 222) marks those numeric sequences, or those tasks processing the numeric sequences (264 and 274), as delayed and moves the processing of those numeric sequences, or the tasks processing the numeric sequences (264 and 274), to the background exception processing processes (214 and 224), in some embodiments. The background filler process (212 and 222) can keep track of a timeout, such that if the processing of numeric sequence exceeds the timeout, then the background filler process (212 and 222) moves the processing of those numeric sequences (264 and 274) to the background exception processing processes (214 and 224). The background exception processing processes (214 and 224) can itself internally maintain a queue that stores the order in which the cache of the various delayed numeric sequences need to be filled, in some embodiments. The background exception processing process (214 and 224) will process these delayed numeric sequences, or the tasks processing the numeric sequences (264 and 274), separate and apart from the background filler process (212 and 222), in these embodiments.

The background in-memory cache filler 222 and exception processing for the in-memory cache 224 will each request (270) values for the numeric sequences being processed from the persistent cache 210. The background persistent cache filler 212 and exception processing for the persistent cache 214 will each access the master numeric sequence data in the master numeric sequence system 242 through the master numeric sequence system interface 240 to obtain additional values for the numeric sequence being processed. The background in-memory cache filler 222 and the exception processing for the in-memory cache 224 will add (272) any values retrieved for the numeric sequences being processed to the first-level in-memory cache 220. The background persistent cache filler 212 and exception processing for the persistent cache 214 will each add (262) any values retrieved for the numeric sequences being processed to the second-level persistent cache 210.

The distributed numeric sequence generator host 120 also comprises a sequence state store 232, in some embodiments. The sequence state store 232 stores the numeric sequence configuration of some or all of the plurality of numeric sequences, in these embodiments. The sequence state store 232 might store only the configurations of the numeric sequences that the host has been servicing, in some embodiments. In other embodiments, the sequence state store 232 might store configurations for all the numeric sequences existing in the master numeric sequence data. There are many other types of storage for a host's sequence configuration cache. The sequence state poller 230 in the sequence generator host configuration 123 can periodically poll (234) the master numeric sequence system 242 through the master numeric sequence system interface 240 for configuration updates to the master numeric sequence data, in some embodiments. This polling can happen every minute for the sequence state poller 230, in some embodiments. When polling (234) the master numeric sequence system 242 for configuration updates to the master numeric sequence data, the sequence state poller 230 in the sequence generator host configuration 123 can then update their own sequence state store 232 with the updated information from the master numeric sequence data, in some embodiments. When a sequence state poller 230 in the sequence generator host configuration 123 learns that a numeric sequence has expired from this polling, the sequence generator host configuration 123 can perform some or all of the actions described previously for expired numeric sequences, in these embodiments.

Figure 3:
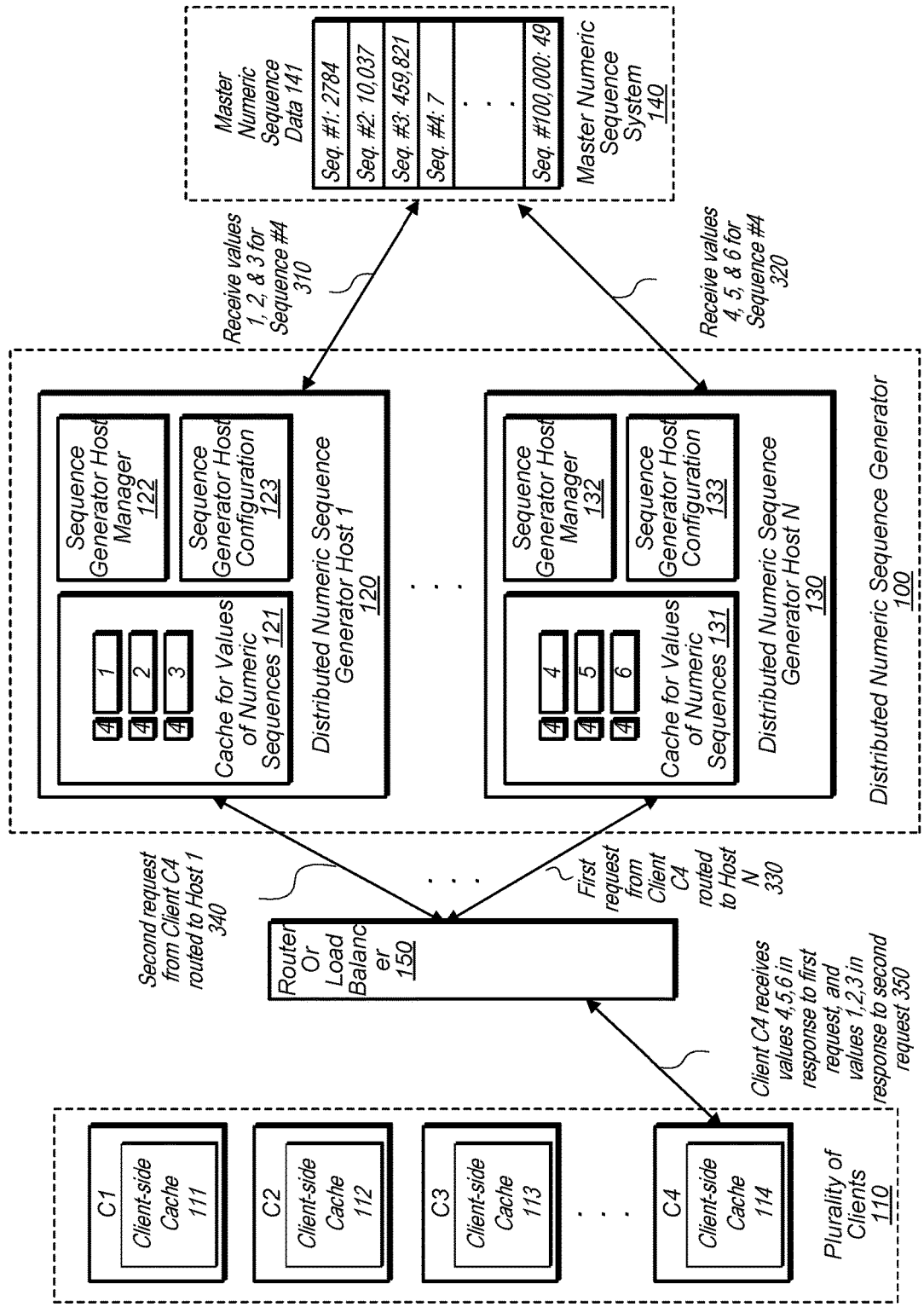
FIG. 3 illustrates a distributed numeric sequence generator in which the caches of the hosts contain values of a numeric sequence, and a client has requested values for the numeric sequence from the distributed numeric sequence generator, according to some embodiments.

FIG. 3 illustrates a distributed numeric sequence generator (100) in which the caches (121 . . . 131) of the hosts (120 . . . 130) contain values of a numeric sequence, and a client C4 (114) has requested and received (350) values for the numeric sequence from the distributed numeric sequence generator (100), according to some embodiments. First, distributed numeric sequence generator host 1 (120) access the master numeric sequence data 141 in the master numeric sequence system (140) to obtain (310) values for numeric sequence #4. The received values 1, 2, and 3 for sequence #4 are stored in the value cache (121). The sequence generator host manager (122) of the distributed numeric sequence generator host 1 (120) can perform this functionality, in some embodiments. When the sequence generator host manager (122) access the master numeric sequence data 141 for sequence #4, it can set the value corresponding to sequence #4 to a 4. Then, distributed numeric sequence generator host N (130) access the master numeric sequence data (141) in the master numeric sequence system (140) to obtain (320) values for numeric sequence #4. The received values 4, 5, and 6 for sequence #4 are stored in the value cache (131). The sequence generator host manager (132) of the distributed numeric sequence generator host N (130) can perform this functionality, in some embodiments. When the sequence generator host manager (132) accesses the master numeric sequence data (141) for sequence #4, it can set the value corresponding to sequence #4 to a 7.

Then client C4 (114) of the plurality of clients (110) requests a first set of values from the distributed numeric sequence generator (110). The router or load balancer (150) routes (330) this first request from client C4 (114) to Host N (130). Distributed numeric sequence generator host N (130) provides numeric values 4, 5, and 6 to client C4 (114) in response to this first request, and client C4 (114) receives (350) these values. Client C4 (114) of the plurality of clients (110) then requests a second set of values from the distributed numeric sequence generator (110). The router or load balancer (150) routes (340) this second request from client C4 (114) to Host 1 (120). Distributed numeric sequence generator host 1 (120) provides numeric values 1, 2, and 3 to client C4 (114) in response to this second request, and client C4 (114) receives (350) these values.

Figure 4:
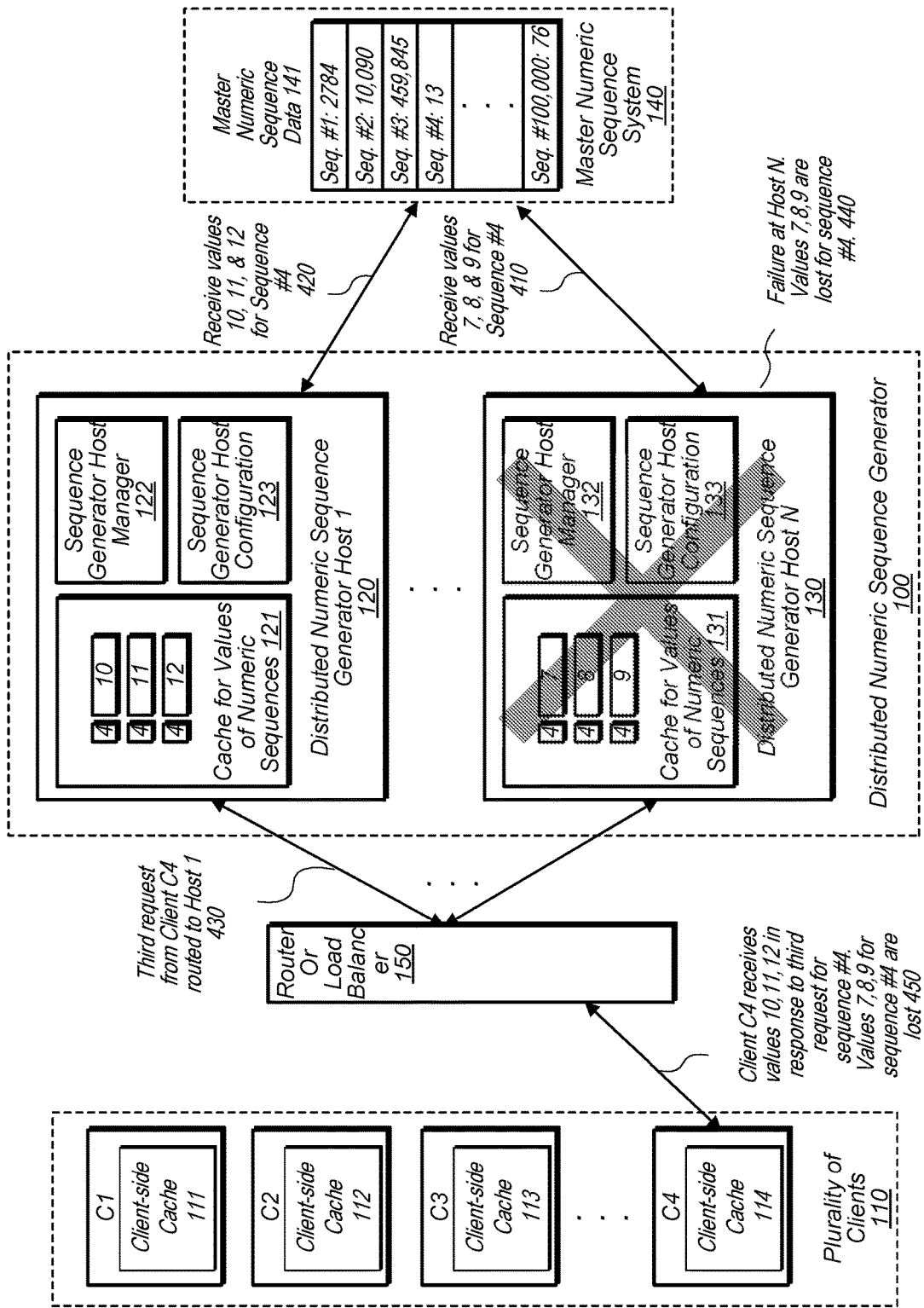
FIG. 4 illustrates a system where one of the hosts of the distributed numeric sequence generator fails, and the values within the cache of the failed host are lost, according to some embodiments.

FIG. 4 illustrates a system where one of the hosts (130) of the distributed numeric sequence generator (100) fails, and the values within the cache (131) of the failed host (130) are lost (440), according to some embodiments. FIG. 4 is a configuration of the embodiments presented in FIG. 3. First in FIG. 4, distributed numeric sequence generator host N (130) access the master numeric sequence data (141) in the master numeric sequence system (140) to obtain (410) values for numeric sequence #4. The received values 7, 8, and 9 for sequence #4 are stored in the value cache (131). The sequence generator host manager (132) of the distributed numeric sequence generator host N (130) can perform this functionality, in some embodiments. When the sequence generator host manager (132) accesses the master numeric sequence data (141) for sequence #4, it can set the value corresponding to sequence #4 to a 10, in some embodiments. Then, distributed numeric sequence generator host 1 (120) access the master numeric sequence data 141 in the master numeric sequence system (140) to obtain (420) values for numeric sequence #4. The received values 10, 11, and 12 for sequence #4 are stored in the value cache (121). The sequence generator host manager (122) of the distributed numeric sequence generator host 1 (120) can perform this functionality, in some embodiments. When the sequence generator host manager (122) access the master numeric sequence data 141 for sequence #4, it can set the value corresponding to sequence #4 to a 13.

Then, at some point in time after Host N (130) has received values 7, 8, and 9 (410) and stored them in its cache (131), Host N fails (440). When host N fails, values 7, 8, and 9 are lost, as the cache is stored in a volatile memory, in some embodiments. Client C4 (114) of the plurality of clients (110) then requests a third set of values from the distributed numeric sequence generator (110). The router or load balancer (150) routes (430) this second request from client C4 (114) to Host 1 (120). Distributed numeric sequence generator host 1 (120) provides numeric values 10, 11, and 12 to client C4 (114) in response to this third request, and client C4 (114) receives (450) these values. Values 7, 8, and 9 remain lost and become holes in the numeric sequence #4.

Figure 5:
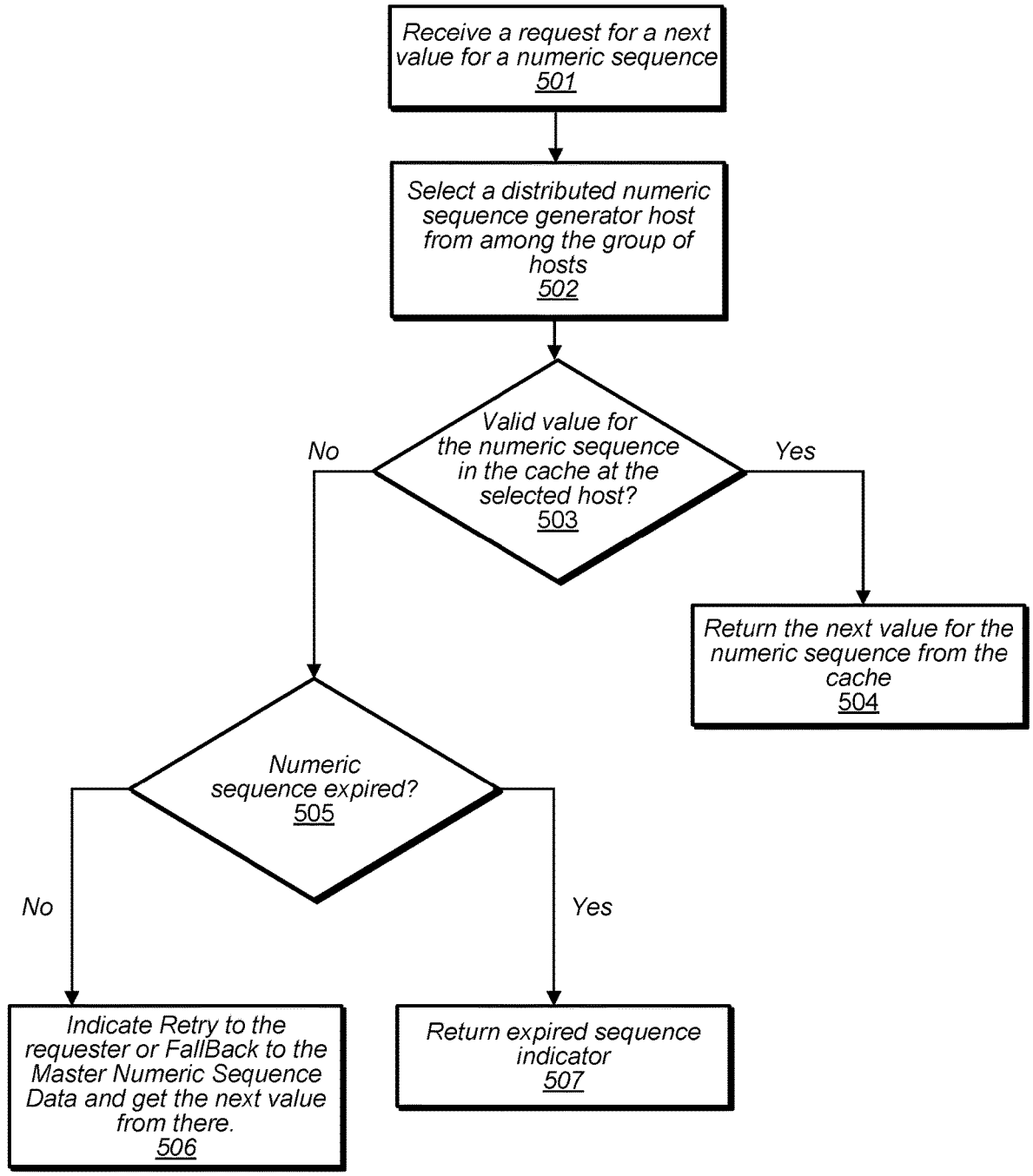
FIG. 5 illustrates a flowchart of an illustrative method of responding to a request for one or more values of a numeric sequence, that could potentially be performed by a host of a distributed numeric sequence generator, according to some embodiments.

FIG. 5 illustrates a flowchart of an illustrative method of responding to a request for one or more values of a numeric sequence, that could potentially be performed by a host of a distributed numeric sequence generator, according to some embodiments. The flowchart starts in block 501 where a request for a next numeric value, or a set of values is received. Then the flowchart transitions to block 502 which selects a distributed numeric sequence generator host from among the group of hosts. Then the flowchart transitions to block 503 that checks whether there is a valid value in the cache at the selected host. If there is a valid value in the cache at the selected host, then the flowchart transitions to block 504 which returns the next value from the cache. If there is not a valid value in the cache at the selected host, then the flowchart determines whether the numeric sequence is expired in block 505. If the numeric sequence is expired, the flowchart transitions to block 507 which returns an indicator indicating that the sequence is expired. If the numeric sequence is not expired, then the flowchart transitions to block 506. In block 506, the flowchart can either indicate a retry to the requestor, in some embodiments, or it can fallback to the master numeric sequence system, and access the master numeric sequence data in the master numeric sequence system to obtain an additional value or values for the numeric sequence. The flowchart can return these values from the master numeric sequence data to the requestor, in some embodiments.

Figure 6:
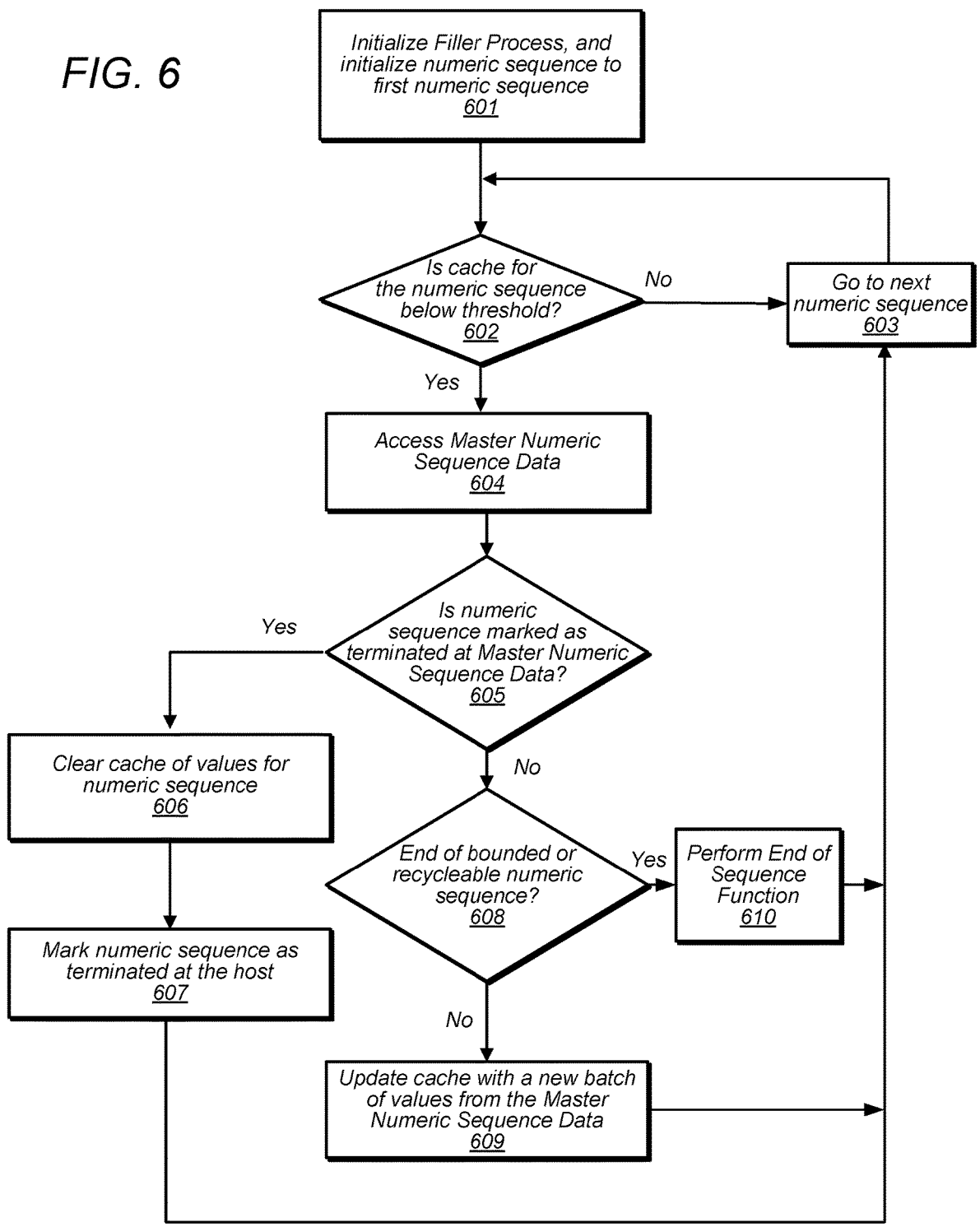
FIG. 6 is a flowchart of an illustrative method of a filler process that fills a cache with new values from one or more numeric sequences, that could potentially be performed by a host of a distributed numeric sequence generator, according to some embodiments.

FIG. 6 is a flowchart of an illustrative method of a filler process that fills a cache with new values from one or more numeric sequences, that could potentially be performed by a host of a distributed numeric sequence generator, according to some embodiments. The flowchart begins in block 601 that initializes the filler process to check the first numeric sequence of a plurality of numeric sequences. The flowchart then transitions to block 602 which determines whether the number of values in the cache for the numeric sequence is below a certain threshold. If the number of values in the cache for the numeric sequence is not below a certain threshold, then there is no need to refill the cache and so the filler process simply transitions to block 603 to go to the next sequence and then returns again to block 602 to check the cache for that new sequence. If, however, the number of values in the cache for the numeric sequence is below a certain threshold, then the flowchart transitions to block 604 which accesses the master numeric sequence data in order to potentially obtain a new batch of values for the cache.

The flowchart then transitions to block 605 which determines if the numeric sequence is marked as terminated or expired at the master numeric sequence data. If the numeric sequence is marked as being terminated or expired, then the flowchart transitions to block 606 that clears the cache of values for the numeric sequence, and then block 607 which marks the numeric sequence as terminated at the particular host. The flowchart then returns to block 603 to go to the next numeric sequence. If the numeric sequence is not marked as being terminated or expired, then the flowchart transitions to block 608 which determines whether the end of a bounded or recyclable numeric sequence has been reached. If the end of a bounded or recyclable sequence has not been reached, then the flowchart transitions to block 609 which updates the cache with a new batch of values from the master numeric sequence data. The flowchart then transitions to block 603 to go to the next sequence, and then returns again to block 602 to check the cache for that new sequence. If however, the end of a bounded or recyclable sequence has been reached, the flowchart transitions to block 610 which performs the end of sequence function. This end of sequence function is described in FIG. 7 below. After the end of sequence function is finished, the flowchart transitions back to block 603 to go to the next numeric sequence.

Figure 7:
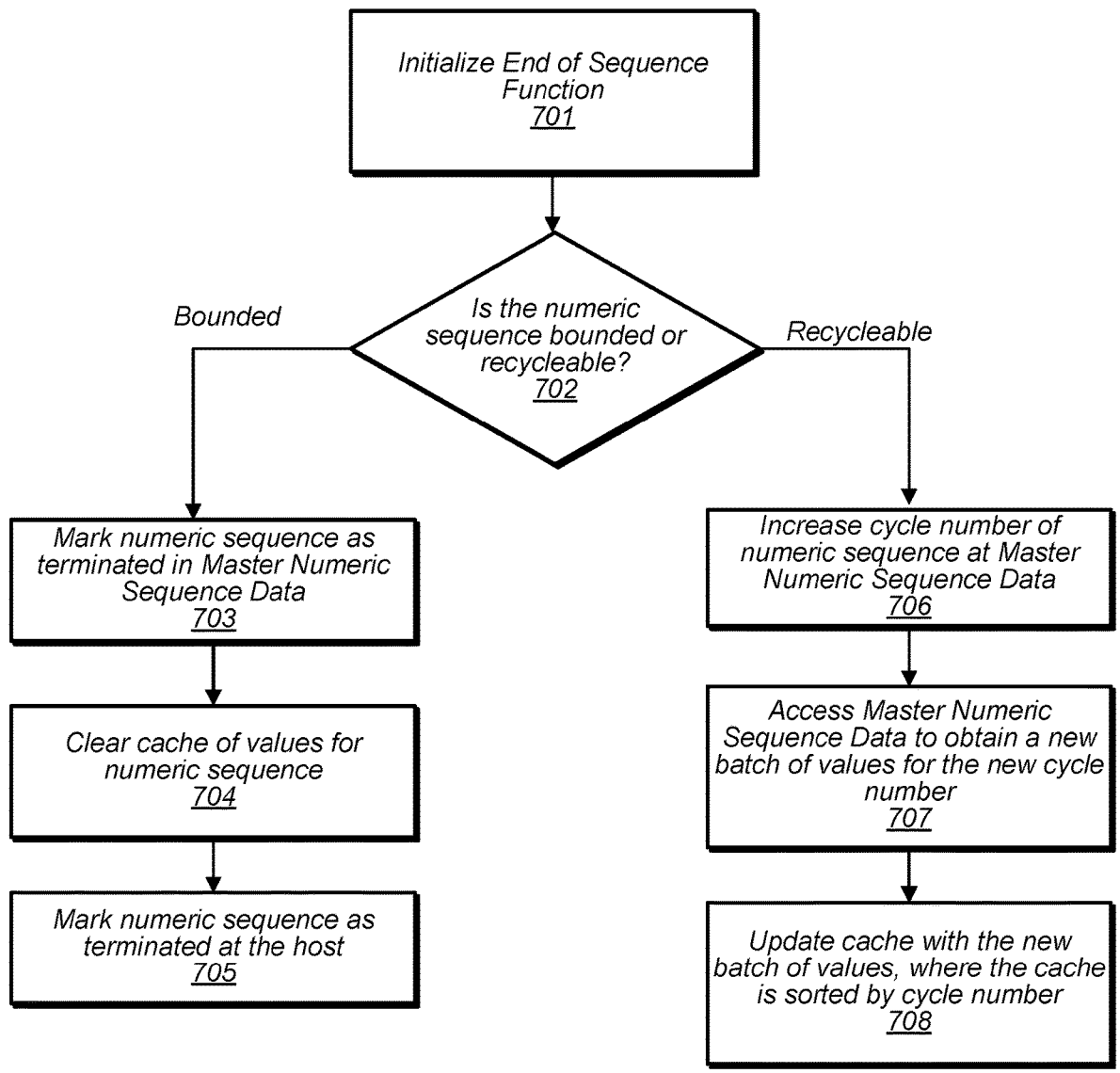
FIG. 7 is a flowchart of an illustrative method for dealing with the potential end of a numeric sequence, that could potentially be performed by a host of a distributed numeric sequence generator, according to some embodiments.

FIG. 7 is a flowchart of an illustrative method for dealing with the potential end of a numeric sequence, that could potentially be performed by a host of a distributed numeric sequence generator, according to some embodiments. The flowchart begins in block 701 which initializes the end of sequence process or function. The flowchart transitions to block 702 which determines whether the numeric sequence is bounded or recyclable. If the numeric sequence is determined to be bounded, then the flowchart transitions to block 703 which marks the numeric sequence as terminated in the master numeric sequence data, then block 704 which clears the cache of values for the numeric sequence, and then block 705 which marks the numeric sequence as terminated at the host. If the numeric sequence is determined to be recyclable, then the flowchart transitions to block 706 which increases the cycle number of the numeric sequence at the master numeric sequence data, then block 707 which accesses the master numeric sequence data to obtain a new batch of values for the new cycle number, and finally to block 708 which updates the cache with the new batch of values, where the cache is sorted by cycle number.

Figure 8:
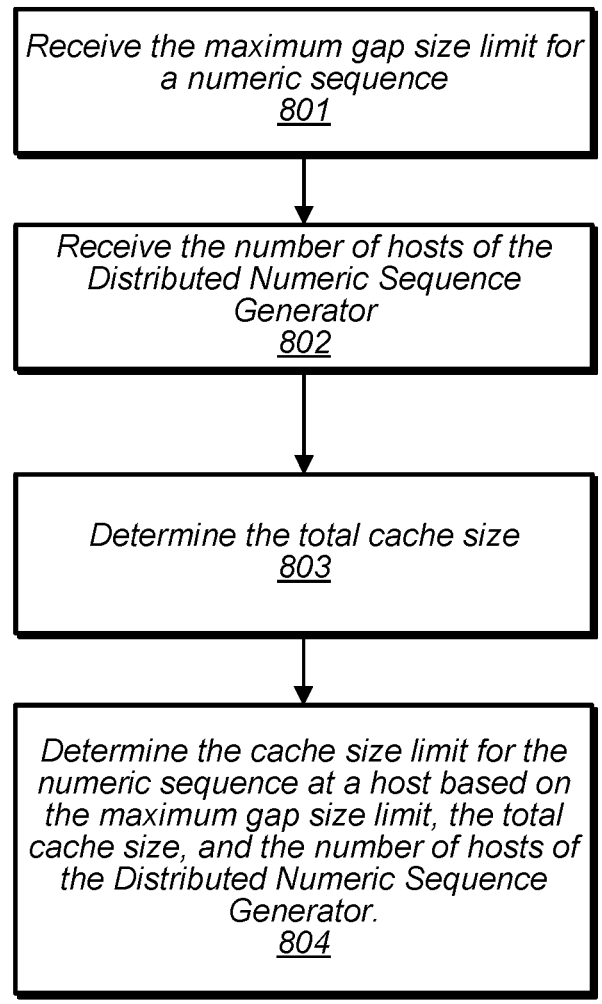
FIG. 8 is a flowchart of an illustrative method of determining the potential cache size for storing values of a numeric sequence at a host, that could potentially be performed by a host of a distributed numeric sequence generator, according to some embodiments.

FIG. 8 is a flowchart of an illustrative method of determining the potential cache size for storing values of a numeric sequence at a host, that could potentially be performed by a host of a distributed numeric sequence generator, according to some embodiments. The flowchart beings at block 801 which receives the maximum gap size limit for a numeric sequence. Then the flowchart transitions to block 802 which receives the number of hosts associated with the distributed number sequence generator. Then the flowchart transitions to block 803 which determines the total cache size, potentially using the received maximum gap size limit from block 801 in some embodiments. Then the flowchart transitions to block 804 which determines the cache size limit for the numeric sequence at a host based on the maximum gap size limit, the total cache size, and the number of hosts associated with the distributed numeric sequence generator.

Figure 9:
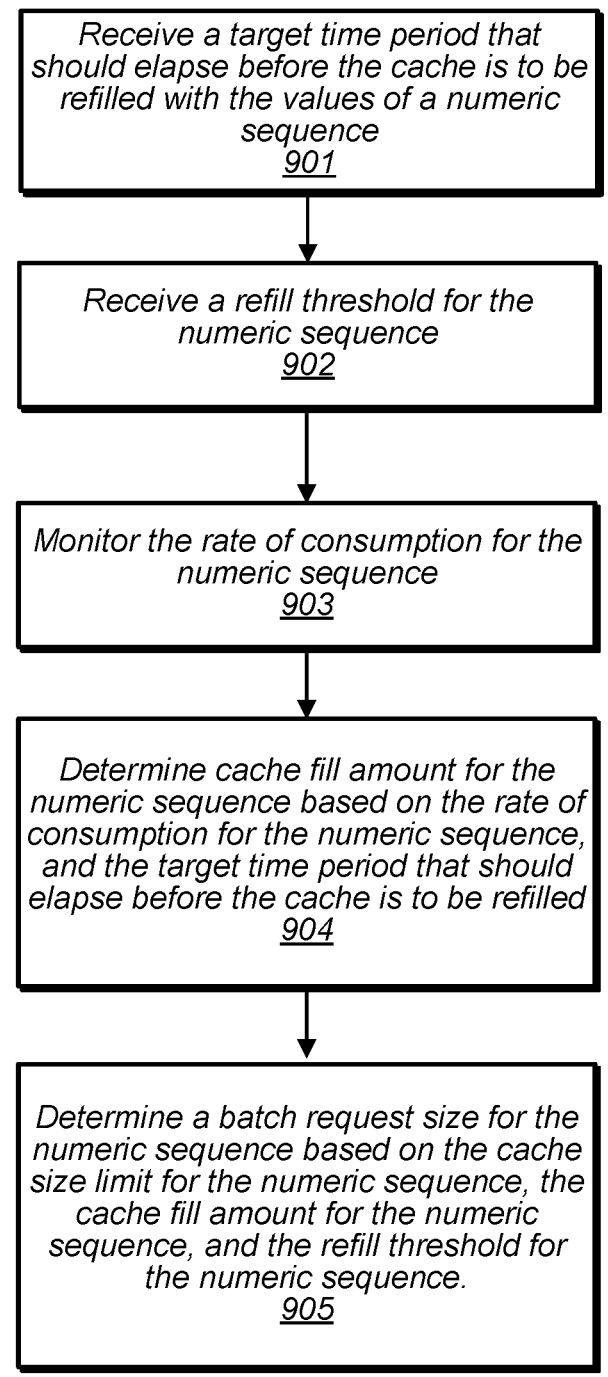
FIG. 9 is a flowchart of an illustrative method of determining the amount of values of a numeric sequence to request in any given batch request, that could potentially be performed by a host of a distributed numeric sequence generator, according to some embodiments.

FIG. 9 is a flowchart of an illustrative method of determining the amount of values of a numeric sequence to request in any given batch request, that could potentially be performed by a host of a distributed numeric sequence generator, according to some embodiments. The flowchart begins in bock 901 which receives a target time period that should elapse before a cache is to be refilled with the values of a numeric sequence. The flowchart transitions to block 902 where a refill threshold for the numeric sequence is received. The flowchart transitions to block 903 where the rate of consumption for the numeric sequence is monitored. The flowchart transitions to block 904 a cache fill amount for the numeric sequence is determined based on the rate of consumption for the numeric sequence, and the target time period that should elapse before the cache is to refilled. The flowchart transitions to block 905 where a batch request size for the numeric sequence is determined based on the cache size limit for the numeric sequence, the cache fill amount for the numeric sequence, and the refill threshold for the numeric sequence.

A Network Connection Manager in a Provider Network

This section describes example provider network environments in which embodiments of a network connection manager may be implemented. However, these example provider network environments are not intended to be limiting.

Figure 10:
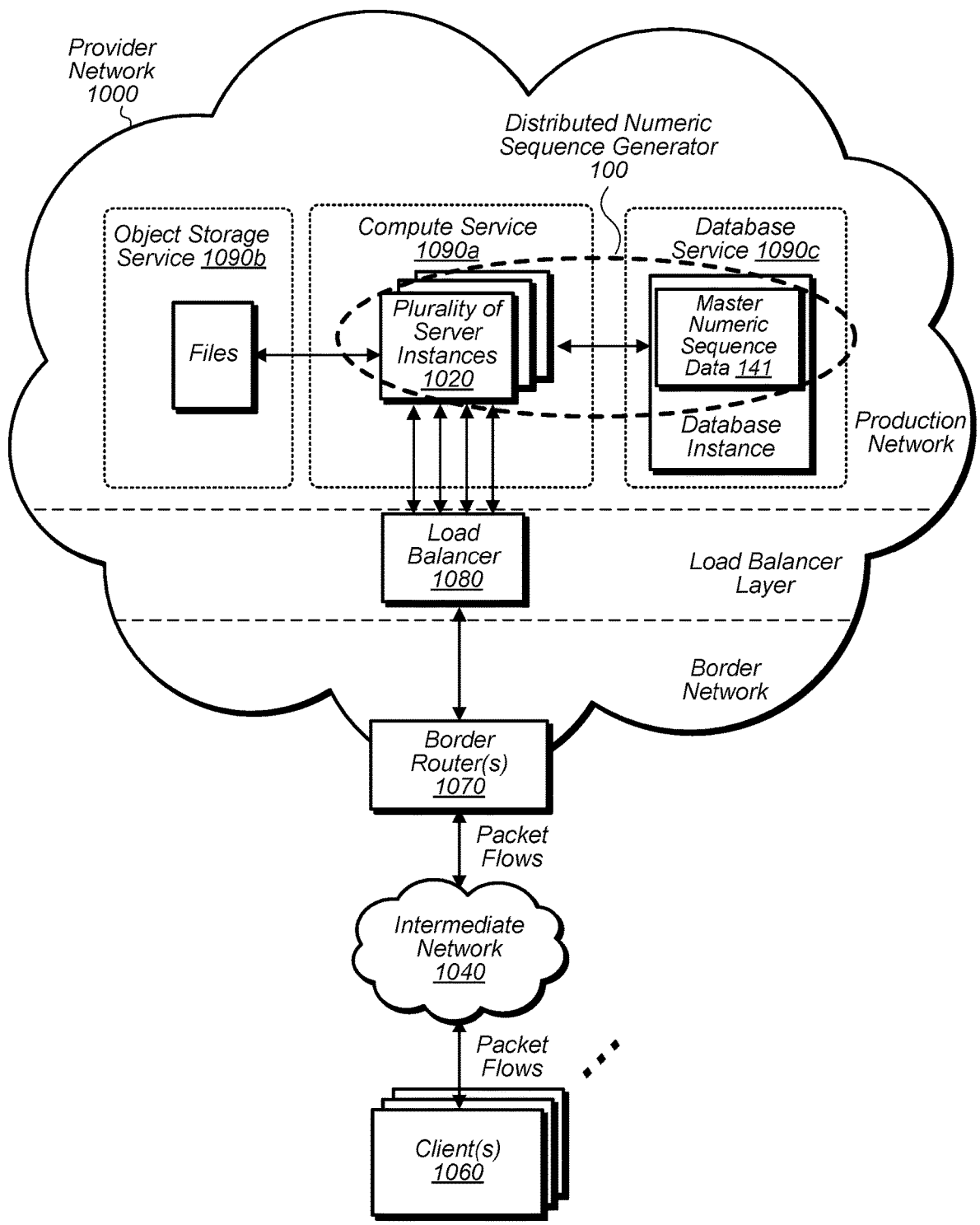
FIG. 10 illustrates a distributed numeric sequence generator in an example provider network environment, according to at least some embodiments.

FIG. 10 illustrates a distributed numeric sequence generator 100 in an example provider network environment 1000, according to at least some embodiments. A service provider network 1000 may provide computing resources 1020 via one or more computing services 1090*a* to the client(s) 1060. The service provider network 1000 may be operated by an entity to provide one or more services, such as various types of cloud-based computing or storage services, accessible via the Internet and/or other networks 1040 to client(s) 1060. In some embodiments, the service provider network 1000 may implement a web server, for example hosting an e-commerce website. Service provider network 1000 may include numerous data centers hosting various resource pools, such as collections of physical and/or virtualized computer servers, storage devices, networking equipment and the like, needed to implement and distribute the infrastructure and services offered by the service provider network 1000. In some embodiments, service provider network may employ computing resources 1020 for its provided services. These computing resources 1020 may in some embodiments be offered to client(s) 1060 in units called "instances," such as virtual compute instances.

A provider network 1000 may provide resource virtualization to clients via one or more virtualization services that allow clients to access, purchase, rent, or otherwise obtain instances of virtualized resources, including but not limited to computation and storage resources, implemented on devices within the provider network or networks in one or more data centers. In some embodiments, private IP addresses may be associated with the resource instances; the private IP addresses are the internal network addresses of the resource instances on the provider network 1000. In some embodiments, the provider network 1000 may also provide public IP addresses and/or public IP address ranges (e.g., Internet Protocol version 4 (IPv4) or Internet Protocol version 6 (IPv6) addresses) that clients may obtain from the provider 1000.

Conventionally, the provider network 1000, via the virtualization services, may allow a client of the service provider (e.g., a client that operates clients 1060) to dynamically associate at least some public IP addresses assigned or allocated to the client with particular resource instances assigned to the client. The provider network 1000 may also allow the client to remap a public IP address, previously mapped to one virtualized computing resource instance allocated to the client, to another virtualized computing resource instance that is also allocated to the client. Using the virtualized computing resource instances and public IP addresses provided by the service provider, a client of the service provider such as the operator of clients 1060 may, for example, implement client-specific applications and present the client's applications on an intermediate network 940, such as the Internet. Either the clients 1060 or other network entities on the intermediate network 1040 may then generate traffic to a destination domain name published by the clients 1060. First, either the clients 1060 or the other network entities make a request through the load balancer 1080 for a connection to a compute instance in the plurality of compute instances 1020.

The load balancer 1080 responds with the identifying information which might include a public IP address of itself. Then the clients 1060 or other network entities on the intermediate network 1040 may then generate traffic to public IP address that was received by the router service. The traffic is routed to the service provider data center, and at the data center is routed, via a network substrate, to the private IP address of the network connection manager currently mapped to the destination public IP address. Similarly, response traffic from the network connection manager may be routed via the network substrate back onto the intermediate network 1040 to the source entity.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance. Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 1000; a client may then assign their allocated public IP addresses to particular resource instances allocated to the client. These public IP addresses may be referred to as client public IP addresses, or simply client IP addresses. Instead of being assigned by the provider network 1000 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. A client IP address can be an Elastic IP address. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

A provider network 1000 may provide a compute service 1090a implemented by physical server nodes to clients 1060, which includes a plurality of compute instances 1020. The compute service also contains many other server instances for many other clients and other customers of the provider network 1000. As another example, the provider network provides a virtualized data storage service or object storage service 1090b which can include a plurality of data storage instances implemented by physical data storage nodes. The data storage service or object storage service 1090b can store files for the client, which are accessed by the appropriate server instance of the client. As another example, the provider network might provide a virtualized database service 1090c implemented by database nodes, which includes at least one database instance for a client. A server instance pertaining to the client in the compute service can access a database instance pertaining to the client when needed. The database service and data storage service also contain multiple files or database instances that pertain to other clients and other customers of the provider network 1000. The provider network can also include multiple other client services that pertain to one or more customers. The clients 1060 may access any one of the client services 1090a, 1090b, or 1090c, for example, via an interface, such as one or more APIs to the service, to obtain usage of resources (e.g., data storage instances, or files, or database instances, or server instances) implemented on multiple nodes for the service in a production network portion of the provider network 1000.

Communication from the clients to an instance of a service can be routed to the appropriate instance by a border router 1070 and a load balancer 1080. Server nodes in the compute service 1090a may each implement a server, for example a web server or application server or a cloud-based browser. One or more load balancers 1080 may be implemented in a network connection manager layer between the border network and the production network. Border router(s) 1070 may receive packets (e.g., TCP packets) in packet flows from clients 1060 via an intermediate network 1040 such as the Internet, and forward the packets to the appropriate server node or instance, or it might forward the packets containing a public IP address to an apparatus that can map the public IP address to a private IP address. The packets may be targeted at the public IP address(es) included in responses to requests. The load balancers 1080 may use the procedures described herein to determine target server nodes or compute instances in the plurality of compute instances 1020 for the packet flows, and to facilitate traffic between the compute instances and the clients 1060.

In the embodiments shown in FIG. 10, some or all of the plurality of server instances 1020 of the compute service 1090a are used to implement the various hosts of the distributed numeric sequence generator 100. In addition, the database instance in the database service 1090c is used to host the master numeric sequence data 141 as a table of the database instance. The plurality of server instances 1020 that are used to implement the various hosts of the distributed numeric sequence generator 100 can access the master numeric sequence data 141 in the database service 1090c as described previously. The plurality of server instances 1020 that are acting as the hosts of the distributed numeric sequence generator 100 are providing numeric sequences to the plurality of clients 1060. The plurality of clients 1060 are requesting and using the values of the numeric sequences for the purposes of whatever application the plurality of clients 1060 are executing. When a client 1060 requests additional values for a numeric sequence from the distributed numeric sequence generator 100, the request can be sent to any of the hosts of the distributed numeric sequence generator 100, in some embodiments. In these embodiments, any host of the distributed numeric sequence generator 100 is capable of responding to requests for values of any numeric sequence from any client 1060. All the hosts of the distributed numeric sequence generator 100 can vend values for all the numeric sequences, in these embodiments.

Illustrative System

Figure 11:
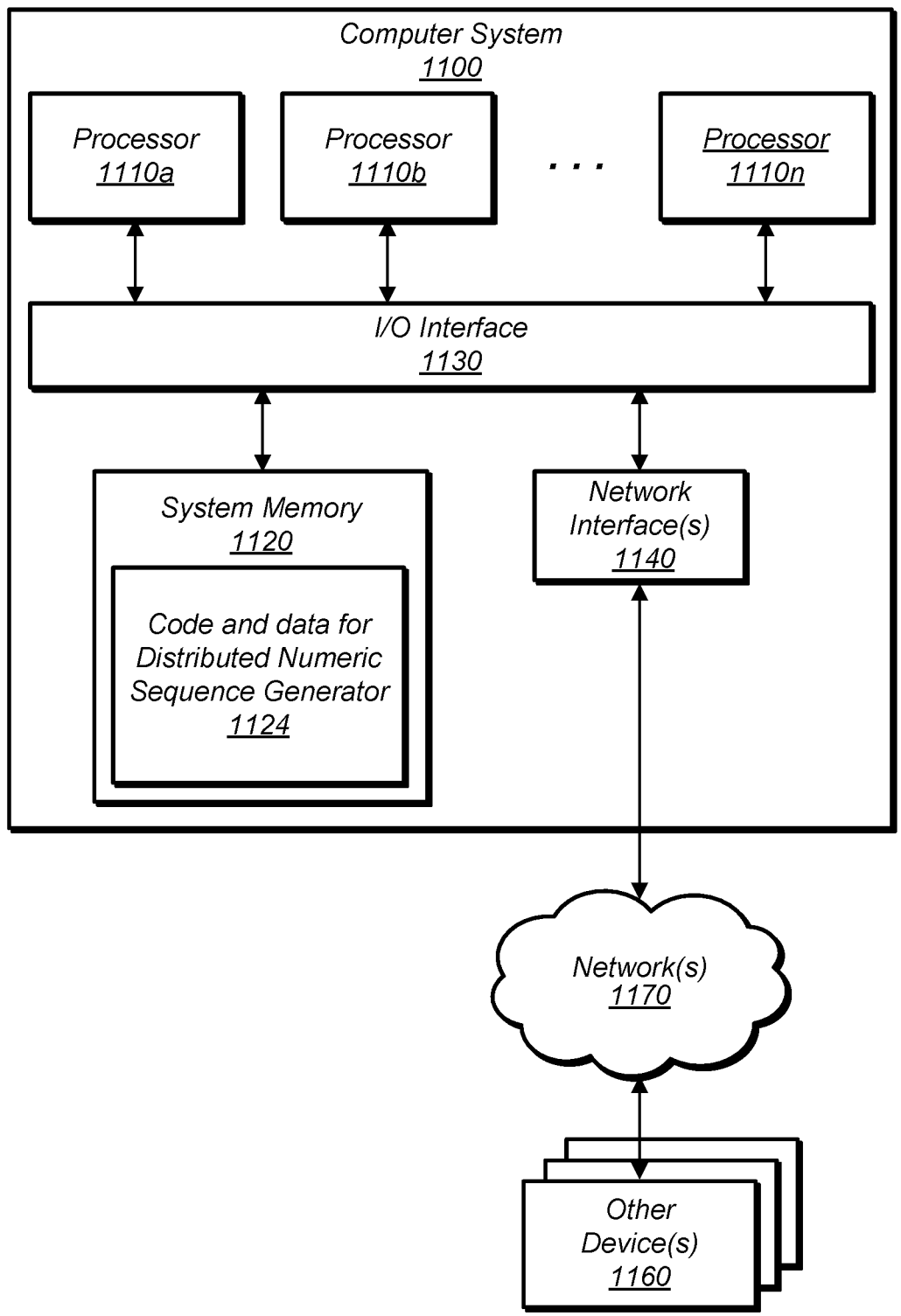
FIG. 11 is a block diagram illustrating an example computer system that may be used for a distributed numeric sequence generator in some embodiments.

In at least some embodiments, a computer that implements a portion or all of the methods and apparatus for a distributed numeric sequence generator as described herein may include a general-purpose computer system or computing device that includes or is configured to access one or more computer-accessible media, such as computer system 1100 illustrated in FIG. 11. FIG. 11 is a block diagram illustrating an example computer system that may be used for a distributed numeric sequence generator 100 in some embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for a distributed numeric sequence generator, are shown stored within system memory 1120 as the code and data for a distributed numeric sequence generator 1124.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1020) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1170, such as other computer systems or devices as illustrated in FIGS. 1, 2, 3, and 4, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above for FIGS. 1 through 10 for implementing a distributed numeric sequence generator. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Embodiments of the disclosure can be described in view of the following clauses:

Clause 1. A system, comprising:

a distributed numeric sequence generator for a plurality of numeric sequences, the distributed numeric sequence generator comprising a plurality of hosts, the plurality of hosts comprising one or more computers with one or more processors and associated memory, wherein respective ones of the plurality of hosts implement a cache for caching values for the plurality of numeric sequences;

a master numeric sequence system comprising master numeric sequence data for the plurality of numeric sequences, the master numeric sequence system comprising one or more computers, wherein the plurality of hosts of the distributed numeric sequence generator access the master numeric sequence data to obtain values for respective ones of the plurality of numeric sequences, and wherein individual hosts cache a different set of values for a given numeric sequence;

wherein individual ones of the plurality of hosts of the distributed numeric sequence generator are configured to:

receive a request from a client of a plurality of clients of an e-commerce order tracking system for one or more values of at least one numeric sequence of the plurality of numeric sequences for use in the e-commerce order tracking system; and provide to the client the one or more values for the at least one requested numeric sequence from the cache to track orders in the e-commerce order tracking system, without guaranteeing a monotonic order to the provided one or more values.

Clause 2. The system of clause 1, wherein individual hosts of the distributed numeric sequence generator are further configured to:

determine that a quantity of values, in the cache associated with the host, of a numeric sequence of the plurality of numeric sequences is below a refill threshold; access the master numeric sequence data in the master numeric sequence system to obtain additional values for the numeric sequence;

obtain the additional values for the numeric sequence; and store the obtained additional values for the numeric sequence in the cache associated with the host.

Clause 3. The system of clause 2, wherein the cache of at least one host of the distributed numeric sequence generator comprises a two-level cache, wherein the two-level cache comprises an in-memory first level cache and a persistent second level cache;

wherein to determine that the cache associated with the at least one host comprises the one or more values for the at least one requested numeric sequence, the at least one host is further configured to:

determine that the in-memory first level cache comprises the one or more values for the at least one requested numeric sequence;

wherein provide to the client the one or more values for the at least one requested numeric sequence from the cache, the at least one host is further configured to: provide to the client the one or more values for the at least one requested numeric sequence from the in-memory first level cache;

wherein to determine that the quantity of values, in the cache associated with the at least one host, of the numeric sequence of the plurality of numeric sequences is below the refill threshold, the at least one host is further configured to:

determine that the quantity of values, in the persistent second level cache, of the numeric sequence of the plurality of numeric sequences is below the refill threshold; and wherein to store the obtained additional values for the numeric sequence in the cache associated with the at least one host, the at least one host is further configured to: store the obtained additional values for the numeric sequence in the persistent second level cache.

Clause 4. The system of clause 3, wherein the at least one host of the distributed numeric sequence generator is further configured to:

determine that the quantity of values in the in-memory first level cache for a numeric sequence of the plurality of numeric sequences is below a refill threshold;

determine that the persistent second level cache comprises an additional one or more values for the numeric sequence; and provide the additional one or more values from the persistent second level cache to the in-memory first level cache.

Clause 5. The system of clauses 1 to 4, further comprising a load balancer configured to:

receive the request for values of the at least one of the plurality of numeric sequences from the client of the plurality of clients;

determine, based at least in part on a load balancing scheme, one of the hosts of the plurality of hosts of the distributed numeric sequence generator to transmit the request to; and transmit the request to the determined one of the plurality of hosts.

Clause 6. A method, comprising:

receiving, by a host of a plurality of hosts of a distributed numeric sequence generator, a request from a client of a plurality of clients for one or more values of a numeric sequence of a plurality of numeric sequences, wherein individual hosts of the plurality of hosts implement a cache for caching one or more values for the plurality of numeric sequences, and wherein individual hosts cache a different set of values for the numeric sequence; and providing to the client the one or more values for the requested numeric sequence from the cache, without guaranteeing a monotonic order to the provided one or more values.

Clause 7. The method of clause 6, further comprising:

determining that a quantity of values, in the cache associated with the host, of the numeric sequence is below a refill threshold;

accessing master numeric sequence data in a master numeric sequence system to obtain additional values for the numeric sequence, wherein the master numeric sequence data comprises data for the plurality of numeric sequences, wherein the plurality of hosts of the distributed numeric sequence generator access the master numeric sequence data to obtain values for respective ones of the plurality of numeric sequences;

obtaining the additional values for the numeric sequence; and storing the obtained additional values for the numeric sequence in the cache associated with the host.

Clause 8. The system of clause 7, further comprising:

determining that a quantity of values, in the cache associated with the host, of the numeric sequence is below a refill threshold;

accessing information about the numeric sequence in the master numeric sequence data of the master numeric sequence system;

determining that the numeric sequence is designated as expired in master numeric sequence data;

removing the values for the numeric sequence from the cache associated with the host; and designating the numeric sequence as expired at the host.

Clause 9. The method of clauses 7 to 8, wherein the cache of the host of the distributed numeric sequence generator comprises a two-level cache, wherein the two-level cache comprises an in-memory first level cache and a persistent second level cache, the method further comprising:

providing to the client the one or more values for the requested numeric sequence from the in-memory first level cache, and storing the obtained additional values for the numeric sequence from the master numeric sequence data in the persistent second level cache.

Clause 10. The method of clause 9, further comprising:
determining that the quantity of values in the in-memory first level cache for the numeric sequence of the plurality of numeric sequences is below a refill threshold;
determining that the persistent second level cache comprises an additional one or more values for the numeric sequence; and
providing the additional one or more values from the persistent second level cache to the in-memory first level cache.

Clause 11. The method of clauses 6 to 10, further comprising: receiving a second request from a same or different client of the plurality of clients for one or more additional values of the numeric sequence;
determining that the numeric sequence is expired; and
returning an expired sequence indicator for the numeric sequence to the same or different client.

Clause 12. The method of clauses 6 to 11, further comprising:
determining that a quantity of values, in the cache associated with the host, of the numeric sequence is below a refill threshold;
accessing information about the numeric sequence in master numeric sequence data in a master numeric sequence system;
determining that the numeric sequence is bounded by a maximum number which the numeric sequence cannot exceed, and that the numeric sequence is not recyclable;
determining that the numeric sequence has reached the maximum number;
designating the numeric sequence as expired in the master numeric sequence data;
removing the values for the numeric sequence from the cache associated with the host; and
designating the numeric sequence as expired at the host.

Clause 13. The method of clauses 6 to 12, further comprising:
determining that a quantity of values, in the cache associated with the host, of the numeric sequence is below a refill threshold;
accessing information about the numeric sequence in master numeric sequence data of a master numeric sequence system;
determining that the numeric sequence is bounded by a maximum number which the numeric sequence cannot exceed, and that the numeric sequence is recyclable;
determining that the numeric sequence has reached the maximum number;
increasing a cycle number associated with the numeric sequence in the master numeric sequence data;
obtaining additional values for the increased cycle number of the numeric sequence from the master numeric sequence data; and
storing the obtained additional values for the increased cycle number of the numeric sequence in the cache associated with the host.

Clause 14. The method of clause 13, further comprising: sorting the values for the numeric sequence, which are stored in the cache associated with the host, according to the cycle number associated with the numeric sequence.

Clause 15. One or more non-transitory computer-readable storage media storing program instructions that when executed on or across one or more processors of a host of a distributed numeric sequence generator cause the one or more processors to:
receive, by the host of a plurality of hosts of the distributed numeric sequence generator, a request from a client of a plurality of clients for one or more values of a numeric sequence of a plurality of numeric sequences, wherein individual hosts of the plurality of hosts implement a cache for caching one or more values for the plurality of numeric sequences, and wherein individual hosts cache a different set of values for the numeric sequence; and
provide to the client the one or more values for the requested numeric sequence from the cache, without guaranteeing a monotonic order to the provided one or more values.

Clause 16. The one or more non-transitory computer-readable storage media of clause 15, wherein the program instructions cause the host for the distributed numeric sequence generator to further perform:
determine that a quantity of values, in the cache associated with the host, of the numeric sequence is below a refill threshold;
access master numeric sequence data in a master numeric sequence system to obtain additional values for the numeric sequence, wherein the master numeric sequence data comprises data for the plurality of numeric sequences, wherein the plurality of hosts of the distributed numeric sequence generator access the master numeric sequence data to obtain values for respective ones of the plurality of numeric sequences;
obtain the additional values for the numeric sequence; and
store the obtained additional values for the numeric sequence in the cache associated with the host.

Clause 17. The one or more non-transitory computer-readable storage media of clause 16, wherein the program instructions cause the host for the distributed numeric sequence generator to further perform:
determine that a quantity of values, in the cache associated with the host, of the numeric sequence is below a refill threshold;
access information about the numeric sequence in the master numeric sequence data of the master numeric sequence system;
determine that the numeric sequence is designated as expired in master numeric sequence data;
remove the values for the numeric sequence from the cache associated with the host; and
designate the numeric sequence as expired at the host.

Clause 18. The one or more non-transitory computer-readable storage media of clauses 15 to 17, wherein the cache of the host comprises a two-level cache, wherein the two-level cache comprises an in-memory first level cache and a persistent second level cache, and wherein the program instructions cause the host for the distributed numeric sequence generator to further perform:
provide to the client the one or more values for the requested numeric sequence from the in-memory first level cache, and store the obtained additional values for the numeric sequence from the master numeric sequence data in the persistent second level cache.

Clause 19. The one or more non-transitory computer-readable storage media of clauses 15 to 18, wherein the program instructions cause the host for the distributed numeric sequence generator to further perform:
determine that a quantity of values, in the cache associated with the host, of the numeric sequence is below a refill threshold;
access information about the numeric sequence in master numeric sequence data in a master numeric sequence system;
determine that the numeric sequence is bounded by a maximum number which the numeric sequence cannot exceed, and that the numeric sequence is not recyclable;

determine that the numeric sequence has reached the maximum number;
designate the numeric sequence as expired in the master numeric sequence data;
remove the values for the numeric sequence from the cache associated with the host; and
designate the numeric sequence as expired at the host.

Clause 20. The one or more non-transitory computer-readable storage media of clauses 15 to 19, wherein the program instructions cause the host for the distributed numeric sequence generator to further perform:
determine that a quantity of values, in the cache associated with the host, of the numeric sequence is below a refill threshold;
access information about the numeric sequence in master numeric sequence data of a master numeric sequence system;
determine that the numeric sequence is bounded by a maximum number which the numeric sequence cannot exceed, and that the numeric sequence is recyclable;
determine that the numeric sequence has reached the maximum number;
increase a cycle number associated with the numeric sequence in the master numeric sequence data;
obtain additional values for the increased cycle number of the numeric sequence from the master numeric sequence data; and
store the obtained additional values for the increased cycle number of the numeric sequence in the cache associated with the host.

Clause 21. A system, comprising:
a distributed numeric sequence generator for a plurality of numeric sequences, wherein respective ones of the plurality of numeric sequences comprise one or more values, the distributed numeric sequence generator comprising one or more hosts, the one or more hosts comprising one or more computers with one or more processors and associated memory, wherein respective ones of the one or more hosts implement a cache for caching a portion of the one or more values of one or more numeric sequences of the plurality of numeric sequences, wherein respective ones of the one or more hosts are configured to provide unique values for individual ones of the plurality of numeric sequences in response to requests of clients of an e-commerce order tracking system, and wherein the unique values are used by the clients of the e-commerce order tracking system to track orders in the e-commerce order tracking system;
wherein individual ones of the one or more hosts of the distributed numeric sequence generator are configured to:
receive a maximum gap size limit for a numeric sequence of the plurality of numeric sequences;
determine a total cache size of the cache associated with the one or more hosts to store the values of the numeric sequence, such that if the values in the cache were lost then the maximum gap size limit would not be exceeded; and
limit the number of values of the numeric sequence in the cache associated with the one or more hosts to the determined total cache size for the values of the numeric sequence.

Clause 22. The system of clause 21, wherein the distributed numeric sequence generator comprises a plurality of hosts, and wherein individual hosts of the plurality of hosts is further configured to:
determine a host cache size limit for the values of the numeric sequence based at least on the maximum gap size limit for the numeric sequence, a number of hosts associated with the distributed numeric sequence generator, and the total cache size of the cache associated with the one or more hosts; and
limit the number of values of the numeric sequence in the cache associated with the host to the determined host cache size limit.

Clause 23. The system of clause 22, wherein at least one host of the distributed numeric sequence generator is further configured to:
monitor the values of the numeric sequence to determine a rate of consumption of the numeric sequence;
determine a cache fill amount for the numeric sequence based at least in part on the determined rate of consumption of the numeric sequence, and a target time period that should elapse before the cache associated with the at least one host is to be refilled; and determine a batch request size for the numeric sequence based at least in part on the determined host cache size limit for the values of the numeric sequence, the determined cache fill amount for the numeric sequence, and a refill threshold for the numeric sequence.

Clause 24. The system of clauses 21 to 23, wherein the cache associated with at least one host comprises a two-level cache, wherein the two-level cache comprises an in-memory first level cache and a persistent second level cache;
wherein to limit the number of values of the numeric sequence in the cache associated with the at least one host to the determined cache size limit for the numeric sequence, the at least one host of the distributed numeric sequence generator is further configured to: limit the number of values of the numeric sequence in the in-memory first level cache to the determined cache size limit for the numeric sequence; and
wherein the number of values of the numeric sequence in the persistent second level cache is not limited based on the determined cache size limit for the numeric sequence.

Clause 25. The system of clauses 21 to 24, wherein at least one host of the distributed numeric sequence generator is further configured to:
receive a second maximum gap size limit for the numeric sequence of the plurality of numeric sequences;
determine a second cache size limit for the numeric sequence based at least on the second maximum gap size limit for the numeric sequence, the number of hosts associated with the distributed numeric sequence generator, and the total cache size of the cache associated with the at least one host;
limit the number of values of the numeric sequence in the cache associated with the at least one host to the determined second cache size limit for the numeric sequence; and
wherein the second cache size limit results in different performance than the original cache size limit when providing unique values for the numeric sequence in response to client requests.

Clause 26. A method comprising:
receiving, by a host of one or more hosts of a distributed numeric sequence generator, a maximum gap size limit for a numeric sequence of a plurality of numeric sequences, wherein respective ones of the one or more hosts implement a cache for caching a portion of the one or more values of one or more numeric sequences of the plurality of numeric sequences, and wherein respective ones of the one or more hosts are configured to provide unique values for individual ones of the plurality of numeric sequences in response to client requests;
determining a total cache size of the cache associated with the one or more hosts to store the values of the numeric sequence, such that if the values in the cache were lost then the maximum gap size limit would not be exceeded; and limiting the number of values of the numeric sequence in the cache associated with the one or more hosts to the determined total cache size for the values of the numeric sequence.

Clause 27. The method of clause 26, wherein the distributed numeric sequence generator comprises a plurality of hosts, the method further comprising:
determining a host cache size limit for the values of the numeric sequence based at least on the maximum gap size limit for the numeric sequence, a number of hosts associated with the distributed numeric sequence generator, and the total cache size of the cache associated with the plurality of hosts; and
limit the number of values of the numeric sequence to be stored in a cache associated with a host of the plurality of hosts to the determined host cache size limit.

Clause 28. The method of clause 27, further comprising: monitoring the values of the numeric sequence to determine a rate of consumption of the numeric sequence;
determining a cache fill amount for the numeric sequence based at least in part on the determined rate of consumption of the numeric sequence, and a target time period that should elapse before the cache associated with the at least one host is to be refilled; and determining a batch request size for the numeric sequence based at least in part on the determined host cache size limit for the values of the numeric sequence, the determined cache fill amount for the numeric sequence, and a refill threshold for the numeric sequence.

Clause 29. The method of clause 28, further comprising: determining that a quantity of values, in the cache associated with the host, of the numeric sequence is below the refill threshold;
obtaining the batch request size amount of additional values for the numeric sequence; and
storing the obtained additional values for the numeric sequence in the cache associated with the host.

Clause 30. The method of clause 29, wherein to obtain the batch request size amount of additional values for the numeric sequence, the method further comprises:
accessing master numeric sequence data residing in a master numeric sequence system to obtain the batch request size amount of additional values for the numeric sequence.

Clause 31. The method of clauses 26 to 30, wherein the cache associated with at least one host comprises a two-level cache, wherein the two-level cache comprises an in-memory first level cache and a persistent second level cache, and wherein to limit the number of values of the numeric sequence in the cache associated with the one or more hosts to the determined total cache size for the values of the numeric sequence, the method further comprises:
limiting the number of values of the numeric sequence in the in-memory first level cache to the determined cache size limit for the numeric sequence, wherein the number of values of the numeric sequence in the persistent second level cache is not limited based on the determined cache size limit for the numeric sequence.

Clause 32. The method of clause 31, further comprising: receiving a refill threshold for the numeric sequence;
determining that the quantity of values of the numeric sequence in the persistent second level cache is below the refill threshold;
obtaining additional values for the numeric sequence; and storing the obtained additional values for the numeric sequence in the persistent second level cache.

Clause 33. The method of clauses 26 to 32, further comprising: receiving a second maximum gap size limit for the numeric sequence of the plurality of numeric sequences; determining a second cache size limit for the numeric sequence based at least on the second maximum gap size limit for the numeric sequence, the number of hosts associated with the distributed numeric sequence generator, and the total cache size of the cache associated with the at least one host;
limiting the number of values of the numeric sequence in the cache associated with the at least one host to the determined second cache size limit for the numeric sequence; and wherein the second cache size limit results in different performance than the original cache size limit when providing unique values for the numeric sequence in response to client requests.

Clause 34. One or more non-transitory computer-readable storage media storing program instructions that when executed on or across one or more processors of a host for a distributed numeric sequence generator cause the one or more processors to:
receive, by the host of one or more hosts of the distributed numeric sequence generator, a maximum gap size limit for a numeric sequence of a plurality of numeric sequences, wherein respective ones of the one or more hosts implement a cache for caching a portion of the one or more values of one or more numeric sequences of the plurality of numeric sequences, and wherein respective ones of the one or more hosts are configured to provide unique values for individual ones of the plurality of numeric sequences in response to client requests;
determine a total cache size of the cache associated with the one or more hosts to store the values of the numeric sequence, such that if the values in the cache were lost then the maximum gap size limit would not be exceeded; and limit the number of values of the numeric sequence in the cache associated with the one or more hosts to the determined total cache size for the values of the numeric sequence.

Clause 35. The one or more non-transitory computer-readable storage media of clause 34, wherein the program instructions cause the host for the distributed numeric sequence generator to further perform:
determine a host cache size limit for the values of the numeric sequence, wherein the distributed numeric sequence generator comprises a plurality of hosts, based at least on the maximum gap size limit for the numeric sequence, a number of hosts associated with the distributed numeric sequence generator, and the total cache size of the cache associated with the plurality of hosts; and
limit the number of values of the numeric sequence to be stored in a cache associated with a host of the plurality of hosts to the determined host cache size limit.

Clause 36. The one or more non-transitory computer-readable storage media of clause 35, wherein the program instructions cause the host for the distributed numeric sequence generator to further perform:
monitor the values of the numeric sequence to determine a rate of consumption of the numeric sequence;
determine a cache fill amount for the numeric sequence based at least in part on the determined rate of consumption of the numeric sequence, and a target time period that should elapse before the cache associated with the at least one host is to be refilled; and
determine a batch request size for the numeric sequence based at least in part on the determined host cache size limit for the values of the numeric sequence, the determined cache fill amount for the numeric sequence, and a refill threshold for the numeric sequence.

Clause 37. The one or more non-transitory computer-readable storage media of clause 36, wherein the program instructions cause the host for the distributed numeric sequence generator to further perform:
determine that a quantity of values, in the cache associated with the host, of the numeric sequence is below the refill threshold;
obtain the batch request size amount of additional values for the numeric sequence; and store the obtained additional values for the numeric sequence in the cache associated with the host.

Clause 38. The one or more non-transitory computer-readable storage media of clause 37, wherein to obtain the batch request size amount of additional values for the numeric sequence, the program instructions cause the host for the distributed numeric sequence generator to further perform
access master numeric sequence data residing in a master numeric sequence system to obtain the batch request size amount of additional values for the numeric sequence.

Clause 39. The one or more non-transitory computer-readable storage media of clauses 34 to 38, wherein the cache associated with the host comprises a two-level cache, wherein the two-level cache comprises an in-memory first level cache and a persistent second level cache, and wherein to limit the number of values of the numeric sequence in the cache associated with the host to the determined total cache size for the values of the numeric sequence, the program instructions cause the host for the distributed numeric sequence generator to further perform:
limit the number of values of the numeric sequence in the in-memory first level cache to the determined cache size limit for the numeric sequence, wherein the number of values of the numeric sequence in the persistent second level cache is not limited based on the determined cache size limit for the numeric sequence.

Clause 40. The one or more non-transitory computer-readable storage media of clauses 34 to 39, wherein the program instructions cause the host for the distributed numeric sequence generator to further perform:
receive a second maximum gap size limit for the numeric sequence of the plurality of numeric sequences;
determine a second cache size limit for the numeric sequence based at least on the second maximum gap size limit for the numeric sequence, the number of hosts associated with the distributed numeric sequence generator, and the total cache size of the cache associated with the at least one host; and
limit the number of values of the numeric sequence in the cache associated with the at least one host to the determined second cache size limit for the numeric sequence; wherein the second cache size limit results in different performance than the original cache size limit when providing unique values for the numeric sequence in response to client requests.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a distributed numeric sequence generator for a plurality of numeric sequences, wherein respective ones of the plurality of numeric sequences comprise one or more values, the distributed numeric sequence generator comprising one or more hosts, the one or more hosts comprising one or more computers with one or more processors and associated memory, wherein respective ones of the one or more hosts implement a cache for caching a portion of the one or more values of one or more numeric sequences of the plurality of numeric sequences, wherein respective ones of the one or more hosts are configured to provide unique values for individual ones of the plurality of numeric sequences in response to requests of clients of an e-commerce order tracking system, and wherein the unique values are used by the clients of the e-commerce order tracking system to track orders in the e-commerce order tracking system;
wherein individual ones of the one or more hosts of the distributed numeric sequence generator are configured to:
receive a maximum gap size limit for a numeric sequence of the plurality of numeric sequences;
determine a total cache size of the cache associated with the one or more hosts to store the values of the numeric sequence, such that if the values in the cache were lost then the maximum gap size limit would not be exceeded; and
limit the number of values of the numeric sequence in the cache associated with the one or more hosts to the determined total cache size for the values of the numeric sequence.

2. The system of claim 1, wherein the distributed numeric sequence generator comprises a plurality of hosts, and wherein individual hosts of the plurality of hosts is further configured to:
determine a host cache size limit for the values of the numeric sequence based at least on the maximum gap size limit for the numeric sequence, a number of hosts associated with the distributed numeric sequence generator, and the total cache size of the cache associated with the one or more hosts; and
limit the number of values of the numeric sequence in the cache associated with the host to the determined host cache size limit.

3. The system of claim 2, wherein at least one host of the distributed numeric sequence generator is further configured to:

monitor the values of the numeric sequence to determine a rate of consumption of the numeric sequence;

determine a cache fill amount for the numeric sequence based at least in part on the determined rate of consumption of the numeric sequence, and a target time period that should elapse before the cache associated with the at least one host is to be refilled; and determine a batch request size for the numeric sequence based at least in part on the determined host cache size limit for the values of the numeric sequence, the determined cache fill amount for the numeric sequence, and a refill threshold for the numeric sequence.

4. The system of claim 1, wherein the cache associated with at least one host comprises a two-level cache, wherein the two-level cache comprises an in-memory first level cache and a persistent second level cache;

wherein to limit the number of values of the numeric sequence in the cache associated with the at least one host to the determined cache size limit for the numeric sequence, the at least one host of the distributed numeric sequence generator is further configured to:

limit the number of values of the numeric sequence in the in-memory first level cache to the determined cache size limit for the numeric sequence; and wherein the number of values of the numeric sequence in the persistent second level cache is not limited based on the determined cache size limit for the numeric sequence.

5. The system of claim 1, wherein at least one host of the distributed numeric sequence generator is further configured to:

receive a second maximum gap size limit for the numeric sequence of the plurality of numeric sequences;

determine a second cache size limit for the numeric sequence based at least on the second maximum gap size limit for the numeric sequence, the number of hosts associated with the distributed numeric sequence generator, and the total cache size of the cache associated with the at least one host;

limit the number of values of the numeric sequence in the cache associated with the at least one host to the determined second cache size limit for the numeric sequence; and wherein the second cache size limit results in different performance than the original cache size limit when providing unique values for the numeric sequence in response to client requests.

6. A method comprising:

receiving, by a host of one or more hosts of a distributed numeric sequence generator, a maximum gap size limit for a numeric sequence of a plurality of numeric sequences, wherein respective ones of the one or more hosts implement a cache for caching a portion of the one or more values of one or more numeric sequences of the plurality of numeric sequences, and wherein respective ones of the one or more hosts are configured to provide unique values for individual ones of the plurality of numeric sequences in response to client requests;

determining a total cache size of the cache associated with the one or more hosts to store the values of the numeric sequence, such that if the values in the cache were lost then the maximum gap size limit would not be exceeded; and limiting the number of values of the numeric sequence in the cache associated with the one or more hosts to the determined total cache size for the values of the numeric sequence.

7. The method of claim 6, wherein the distributed numeric sequence generator comprises a plurality of hosts, the method further comprising:

determining a host cache size limit for the values of the numeric sequence based at least on the maximum gap size limit for the numeric sequence, a number of hosts associated with the distributed numeric sequence generator, and the total cache size of the cache associated with the plurality of hosts; and limit the number of values of the numeric sequence to be stored in a cache associated with a host of the plurality of hosts to the determined host cache size limit.

8. The method of claim 7, further comprising:

monitoring the values of the numeric sequence to determine a rate of consumption of the numeric sequence;

determining a cache fill amount for the numeric sequence based at least in part on the determined rate of consumption of the numeric sequence, and a target time period that should elapse before the cache associated with the at least one host is to be refilled; and determining a batch request size for the numeric sequence based at least in part on the determined host cache size limit for the values of the numeric sequence, the determined cache fill amount for the numeric sequence, and a refill threshold for the numeric sequence.

9. The method of claim 8, further comprising:

determining that a quantity of values, in the cache associated with the host, of the numeric sequence is below the refill threshold;

obtaining the batch request size amount of additional values for the numeric sequence; and storing the obtained additional values for the numeric sequence in the cache associated with the host.

10. The method of claim 9, wherein to obtain the batch request size amount of additional values for the numeric sequence, the method further comprises:

accessing master numeric sequence data residing in a master numeric sequence system to obtain the batch request size amount of additional values for the numeric sequence.

11. The method of claim 6, wherein the cache associated with at least one host comprises a two-level cache, wherein the two-level cache comprises an in-memory first level cache and a persistent second level cache, and wherein to limit the number of values of the numeric sequence in the cache associated with the one or more hosts to the determined total cache size for the values of the numeric sequence, the method further comprises:

limiting the number of values of the numeric sequence in the in-memory first level cache to the determined cache size limit for the numeric sequence, wherein the number of values of the numeric sequence in the persistent second level cache is not limited based on the determined cache size limit for the numeric sequence.

12. The method of claim 11, further comprising:

receiving a refill threshold for the numeric sequence;

determining that the quantity of values of the numeric sequence in the persistent second level cache is below the refill threshold;

obtaining additional values for the numeric sequence; and storing the obtained additional values for the numeric sequence in the persistent second level cache.

13. The method of claim 6, further comprising:
receiving a second maximum gap size limit for the numeric sequence of the plurality of numeric sequences;
determining a second cache size limit for the numeric sequence based at least on the second maximum gap size limit for the numeric sequence, the number of hosts associated with the distributed numeric sequence generator, and the total cache size of the cache associated with the at least one host;
limiting the number of values of the numeric sequence in the cache associated with the at least one host to the determined second cache size limit for the numeric sequence; and
wherein the second cache size limit results in different performance than the original cache size limit when providing unique values for the numeric sequence in response to client requests.

14. One or more non-transitory computer-readable storage media storing program instructions that when executed on or across one or more processors of a host for a distributed numeric sequence generator cause the one or more processors to:
receive, by the host of one or more hosts of the distributed numeric sequence generator, a maximum gap size limit for a numeric sequence of a plurality of numeric sequences, wherein respective ones of the one or more hosts implement a cache for caching a portion of the one or more values of one or more numeric sequences of the plurality of numeric sequences, and wherein respective ones of the one or more hosts are configured to provide unique values for individual ones of the plurality of numeric sequences in response to client requests;
determine a total cache size of the cache associated with the one or more hosts to store the values of the numeric sequence, such that if the values in the cache were lost then the maximum gap size limit would not be exceeded; and
limit the number of values of the numeric sequence in the cache associated with the one or more hosts to the determined total cache size for the values of the numeric sequence.

15. The one or more non-transitory computer-readable storage media of claim 14, wherein the program instructions cause the host for the distributed numeric sequence generator to further perform:
determine a host cache size limit for the values of the numeric sequence, wherein the distributed numeric sequence generator comprises a plurality of hosts, based at least on the maximum gap size limit for the numeric sequence, a number of hosts associated with the distributed numeric sequence generator, and the total cache size of the cache associated with the plurality of hosts; and
limit the number of values of the numeric sequence to be stored in a cache associated with a host of the plurality of hosts to the determined host cache size limit.

16. The one or more non-transitory computer-readable storage media of claim 15, wherein the program instructions cause the host for the distributed numeric sequence generator to further perform:
monitor the values of the numeric sequence to determine a rate of consumption of the numeric sequence;
determine a cache fill amount for the numeric sequence based at least in part on the determined rate of consumption of the numeric sequence, and a target time period that should elapse before the cache associated with the at least one host is to be refilled; and
determine a batch request size for the numeric sequence based at least in part on the determined host cache size limit for the values of the numeric sequence, the determined cache fill amount for the numeric sequence, and a refill threshold for the numeric sequence.

17. The one or more non-transitory computer-readable storage media of claim 16, wherein the program instructions cause the host for the distributed numeric sequence generator to further perform:
determine that a quantity of values, in the cache associated with the host, of the numeric sequence is below the refill threshold;
obtain the batch request size amount of additional values for the numeric sequence; and
store the obtained additional values for the numeric sequence in the cache associated with the host.

18. The one or more non-transitory computer-readable storage media of claim 17, wherein to obtain the batch request size amount of additional values for the numeric sequence, the program instructions cause the host for the distributed numeric sequence generator to further perform
access master numeric sequence data residing in a master numeric sequence system to obtain the batch request size amount of additional values for the numeric sequence.

19. The one or more non-transitory computer-readable storage media of claim 14, wherein the cache associated with the host comprises a two-level cache, wherein the two-level cache comprises an in-memory first level cache and a persistent second level cache, and wherein to limit the number of values of the numeric sequence in the cache associated with the host to the determined total cache size for the values of the numeric sequence, the program instructions cause the host for the distributed numeric sequence generator to further perform:
limit the number of values of the numeric sequence in the in-memory first level cache to the determined cache size limit for the numeric sequence, wherein the number of values of the numeric sequence in the persistent second level cache is not limited based on the determined cache size limit for the numeric sequence.

20. The one or more non-transitory computer-readable storage media of claim 14, wherein the program instructions cause the host for the distributed numeric sequence generator to further perform:
receive a second maximum gap size limit for the numeric sequence of the plurality of numeric sequences;
determine a second cache size limit for the numeric sequence based at least on the second maximum gap size limit for the numeric sequence, the number of hosts associated with the distributed numeric sequence generator, and the total cache size of the cache associated with the at least one host; and
limit the number of values of the numeric sequence in the cache associated with the at least one host to the determined second cache size limit for the numeric sequence;
wherein the second cache size limit results in different performance than the original cache size limit when providing unique values for the numeric sequence in response to client requests.

* * * * *